(12) United States Patent
Kitamura et al.

(10) Patent No.: US 10,851,685 B2
(45) Date of Patent: Dec. 1, 2020

(54) BALANCER DEVICE AND LUBRICATING SYSTEM FOR OIL PUMP AND BALANCER SHAFT BEARING

(71) Applicant: HITACHI AUTOMOTIVE SYSTEMS, LTD., Hitachinaka (JP)

(72) Inventors: Masaharu Kitamura, Atsugi (JP); Takashi Hirano, Atsugi (JP); Masahumi Kurita, Zama (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/560,211

(22) Filed: Sep. 4, 2019

(65) Prior Publication Data

US 2020/0018198 A1 Jan. 16, 2020

Related U.S. Application Data

(63) Continuation-in-part of application No. PCT/JP2018/003882, filed on Feb. 6, 2018.

(30) Foreign Application Priority Data

Mar. 8, 2017 (JP) .................................. 2017-043403

(51) Int. Cl.
*F01M 1/02* (2006.01)
*F01M 1/10* (2006.01)
(Continued)

(52) U.S. Cl.
CPC ............... *F01M 1/10* (2013.01); *F01M 1/02* (2013.01); *F16C 33/1085* (2013.01); *F16F 15/267* (2013.01); *F01M 2001/0276* (2013.01)

(58) Field of Classification Search
CPC .... F01M 1/10; F01M 1/02; F01M 2001/0276; F16C 33/1085; F16F 15/267
See application file for complete search history.

(56) References Cited

U.S. PATENT DOCUMENTS

| 5,435,334 A * | 7/1995 | Inukai ...................... F01M 1/10 |
| | | 137/115.13 |
| 2002/0129782 A1* | 9/2002 | Kawamoto ............. F01L 1/024 |
| | | 123/90.33 |

(Continued)

FOREIGN PATENT DOCUMENTS

| JP | S58-183912 U | 12/1983 |
| JP | H04-279710 A | 10/1992 |

(Continued)

OTHER PUBLICATIONS

International Search Report dated Mar. 20, 2018 in International Application No. PCT/JP2018/003882.

(Continued)

*Primary Examiner* — Syed O Hasan
(74) *Attorney, Agent, or Firm* — Foley & Lardner LLP

(57) ABSTRACT

Balancer shaft 5 and 6 rotatably set through bearings 11~14 and an oil pump 2 driven by power from the balancer shaft 5 and 6 are provided in a balancer housing. Oil discharged from an outlet portion 42 of the oil pump 2 is supplied to a main oil gallery 10 through an outlet passage 48. A bearing filter 55 that filters a part of the oil is provided in the outlet passage 48 that extends from the outlet portion 42. A communication passage 50 that branches off from the outlet passage 48 and communicates with the bearings 11~14 supplies a part of the oil having been filtered by the bearing filter 55 to the bearings 11~14. By filtering the oil that is going to be supplied to the bearing portion, decrease in durability of the bearing portion can be suppressed.

20 Claims, 16 Drawing Sheets

(51) Int. Cl.
*F16C 33/10* (2006.01)
*F16F 15/26* (2006.01)

(56) References Cited

U.S. PATENT DOCUMENTS

| | | | |
|---|---|---|---|
| 2008/0156560 A1* | 7/2008 | Shiozaki | F16H 57/0489 |
| | | | 180/219 |
| 2011/0308492 A1* | 12/2011 | Nishi | F01M 1/02 |
| | | | 123/192.2 |
| 2016/0084147 A1* | 3/2016 | Sotani | F01M 1/02 |
| | | | 123/196 A |
| 2017/0016480 A1 | 1/2017 | Rittmann et al. | |

FOREIGN PATENT DOCUMENTS

| | | |
|---|---|---|
| JP | H09-053433 A | 2/1997 |
| JP | H10-047030 A | 2/1998 |
| JP | 2006-200409 A | 8/2006 |
| JP | 2011-064250 A | 3/2011 |
| JP | 2016-503863 A | 2/2016 |
| JP | 2016-200247 A | 12/2016 |

OTHER PUBLICATIONS

Written Opinion of the International Searching Authority dated Mar. 20, 2018 in International Application No. PCT/JP2018/003882.

* cited by examiner

BALANCER DEVICE AND LUBRICATING SYSTEM FOR OIL PUMP AND BALANCER SHAFT BEARING

TECHNICAL FIELD

The present invention relates to a balancer device and an oil pump used for, for example, an internal combustion engine, and also relates to a lubricating system for a balancer shaft bearing portion.

BACKGROUND ART

There has been a balancer device that directly drives an oil pump, which discharges lubricating oil (hereinafter, simply called oil) of an internal combustion engine, by a balancer shaft of the balancer device.

A balancer device disclosed in, for instance, the following Patent Document 1, lubricates a bearing portion of a balancer shaft by supplying oil discharged from an oil pump to the bearing portion.

CITATION LIST

Patent Document

Patent Document 1: Japanese Unexamined Patent Publication No. JP2006-200409

SUMMARY OF THE INVENTION

Technical Problem

In a related art technique, however, since the oil discharged from the oil pump is directly supplied to the bearing portion of the balancer shaft, so-called contaminant such as metal wear particles trapped in the oil comes to the bearing portion Because of this, there is a risk that durability of the bearing portion of the balancer shaft will be decreased.

An object of the present invention is therefore to provide a balancer device, an oil pump and a lubricating system for a balancer shaft bearing portion which are capable of suppressing the decrease in the durability of the bearing portion of the balancer shaft by previously filtering the oil supplied to the bearing portion of the balancer shaft.

Solution to Problem

According to one aspect of the present invention, a balancer shaft rotatably set through a bearing portion and an oil pump driven by power from the balancer shaft are provided in a housing. Oil is supplied to a main oil gallery from an outlet portion of the oil pump through an outlet passage and an oil filter. A bearing filter that filters apart of the oil flowing in the outlet passage is provided in the outlet passage that extends from the outlet portion toward the outside of the housing. A communication passage, which branches off from the outlet passage and communicates with the bearing portion, supplies the oil having been filtered by the bearing filter to the bearing portion.

Effects of Invention

According to the present invention, it is possible to suppress the decrease in the durability of the bearing portion of the balancer shaft.

EMBODIMENTS FOR CARRYING OUT THE INVENTION

Embodiments of a balancer device etc. of the present invention will be explained below with reference to the drawings.

First Embodiment

Figure 1:
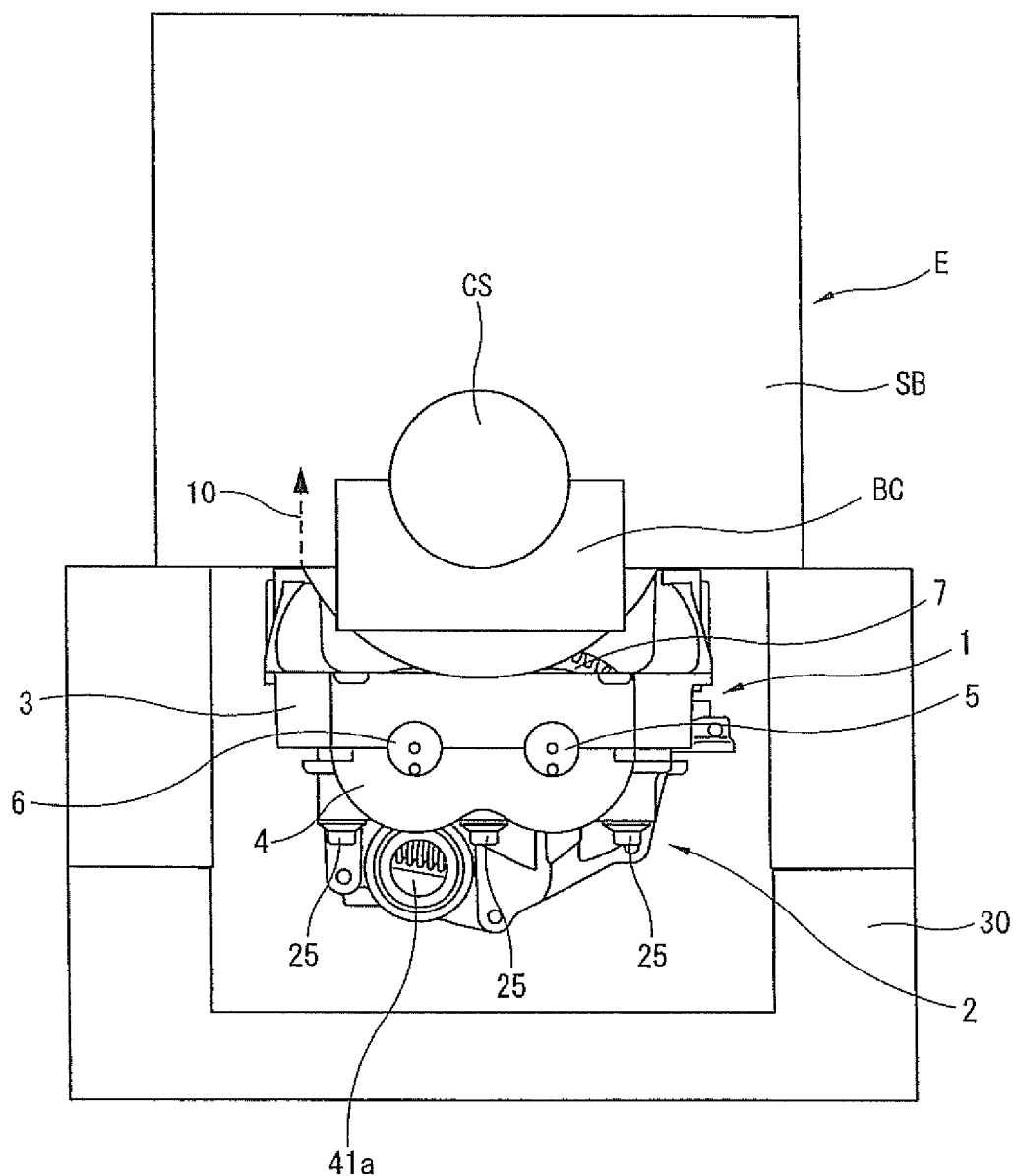
FIG. 1 is a schematic view showing a state in which a balancer device according to a first embodiment is mounted to a lower portion of a cylinder block of an internal combustion engine.
Figure 2:
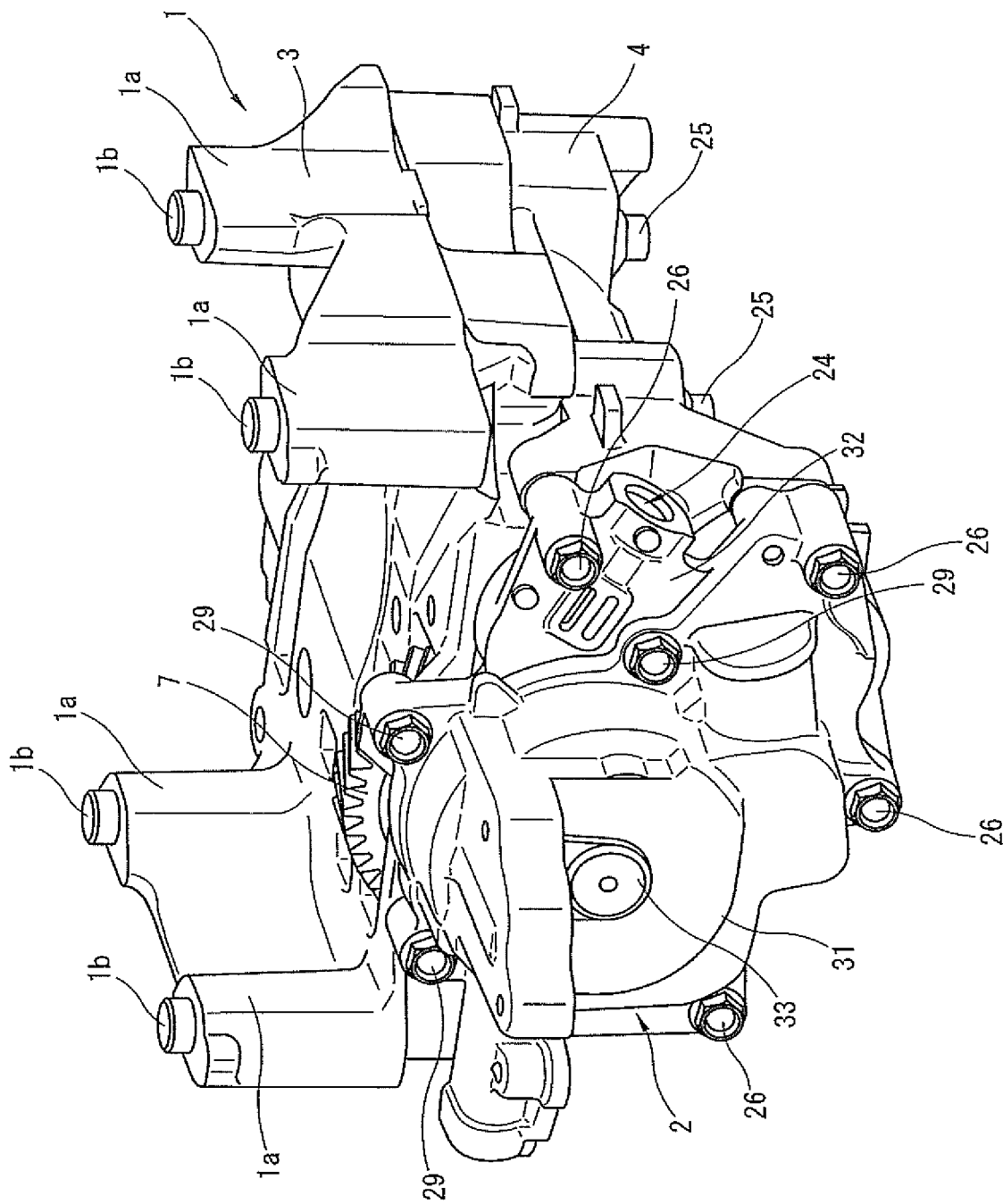
FIG. 2 is a perspective view showing a state in which an oil pump according to the present embodiment is fixed to the balancer device.
Figure 3:
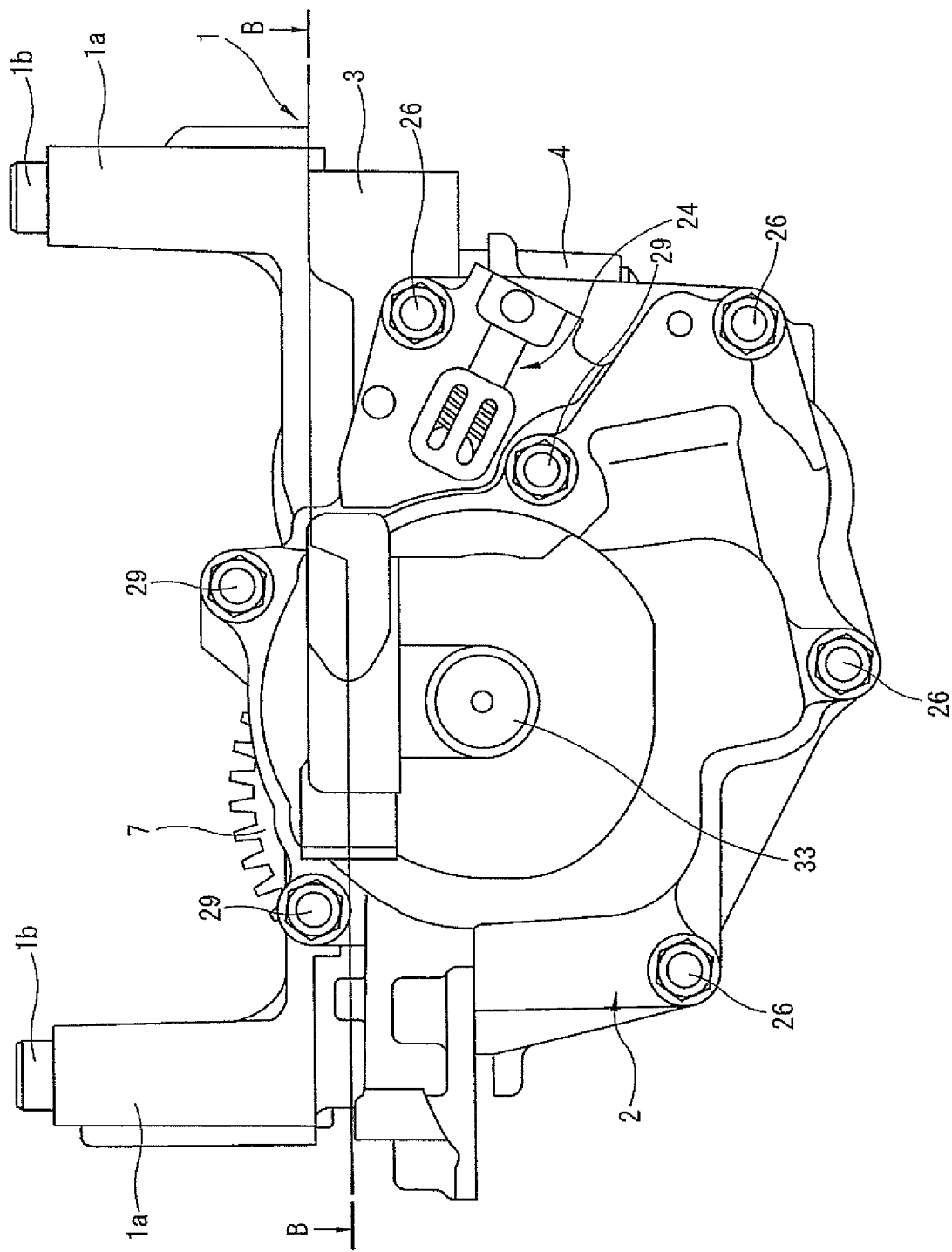
FIG. 3 is a rear view of the oil pump and the balancer device of the present embodiment.
Figure 4:
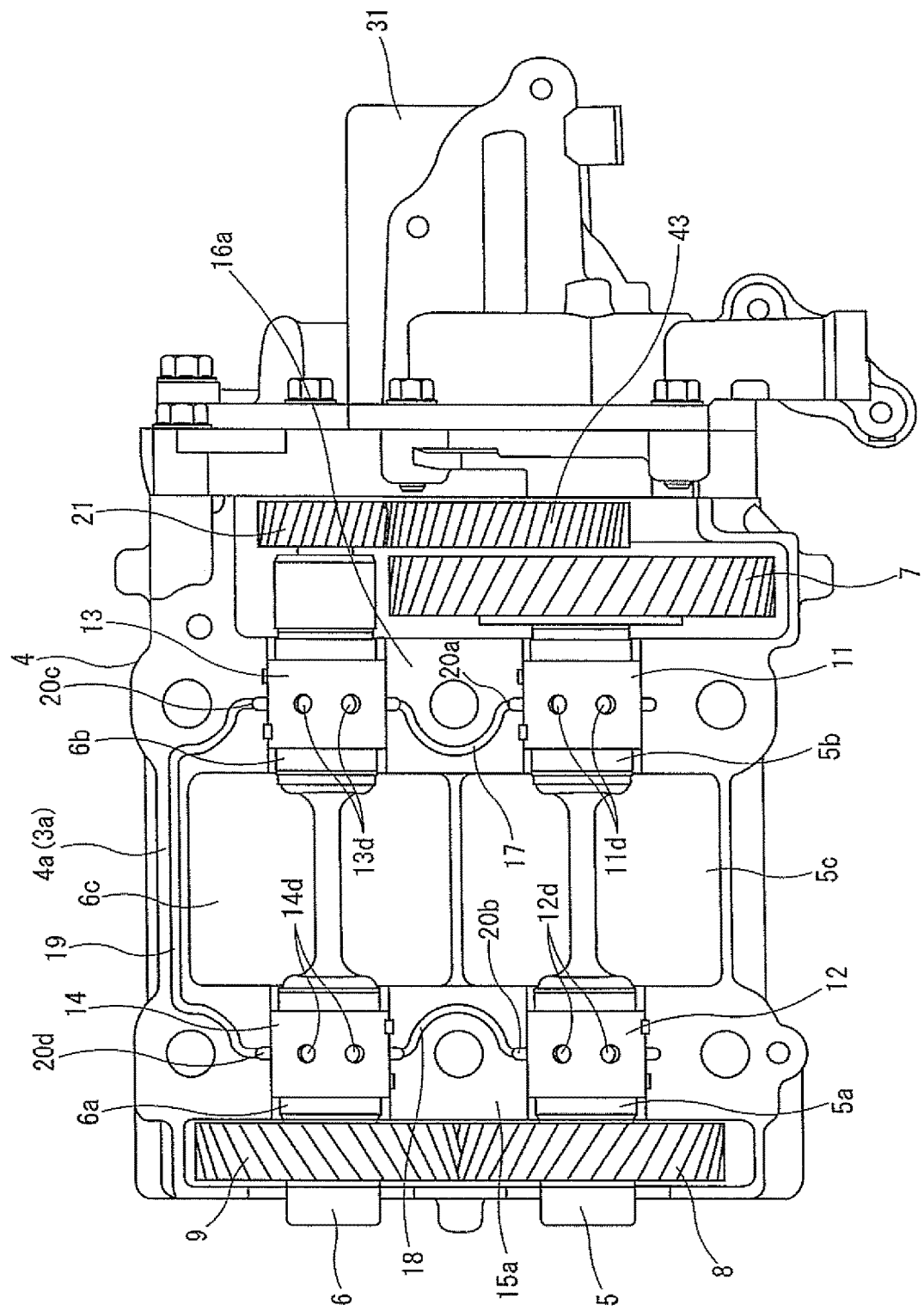
FIG. 4 is a plan view of the balancer device of the present embodiment with an upper housing being removed.
Figure 5:
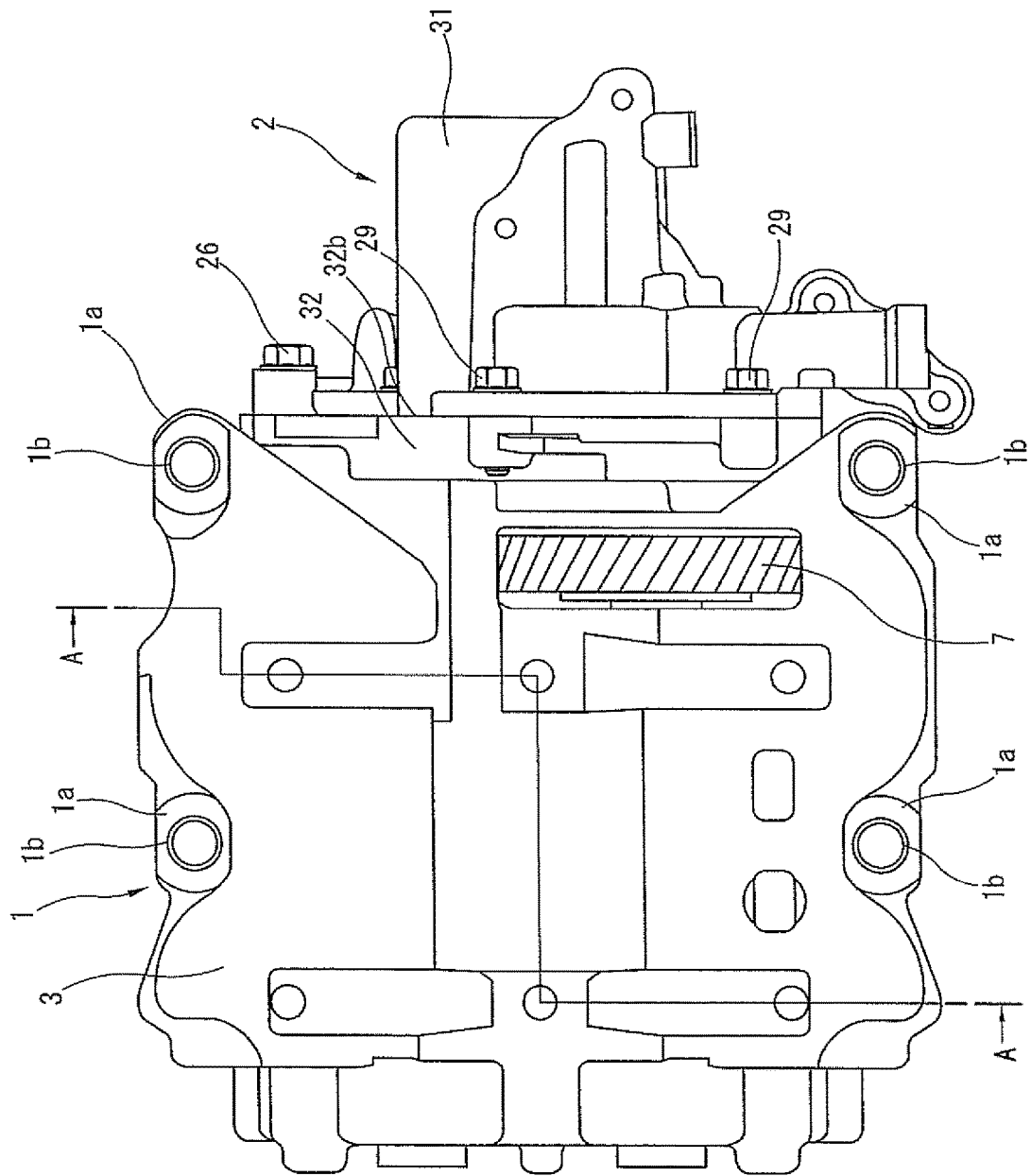
FIG. 5 is a plan view of the balancer device.
Figure 6:
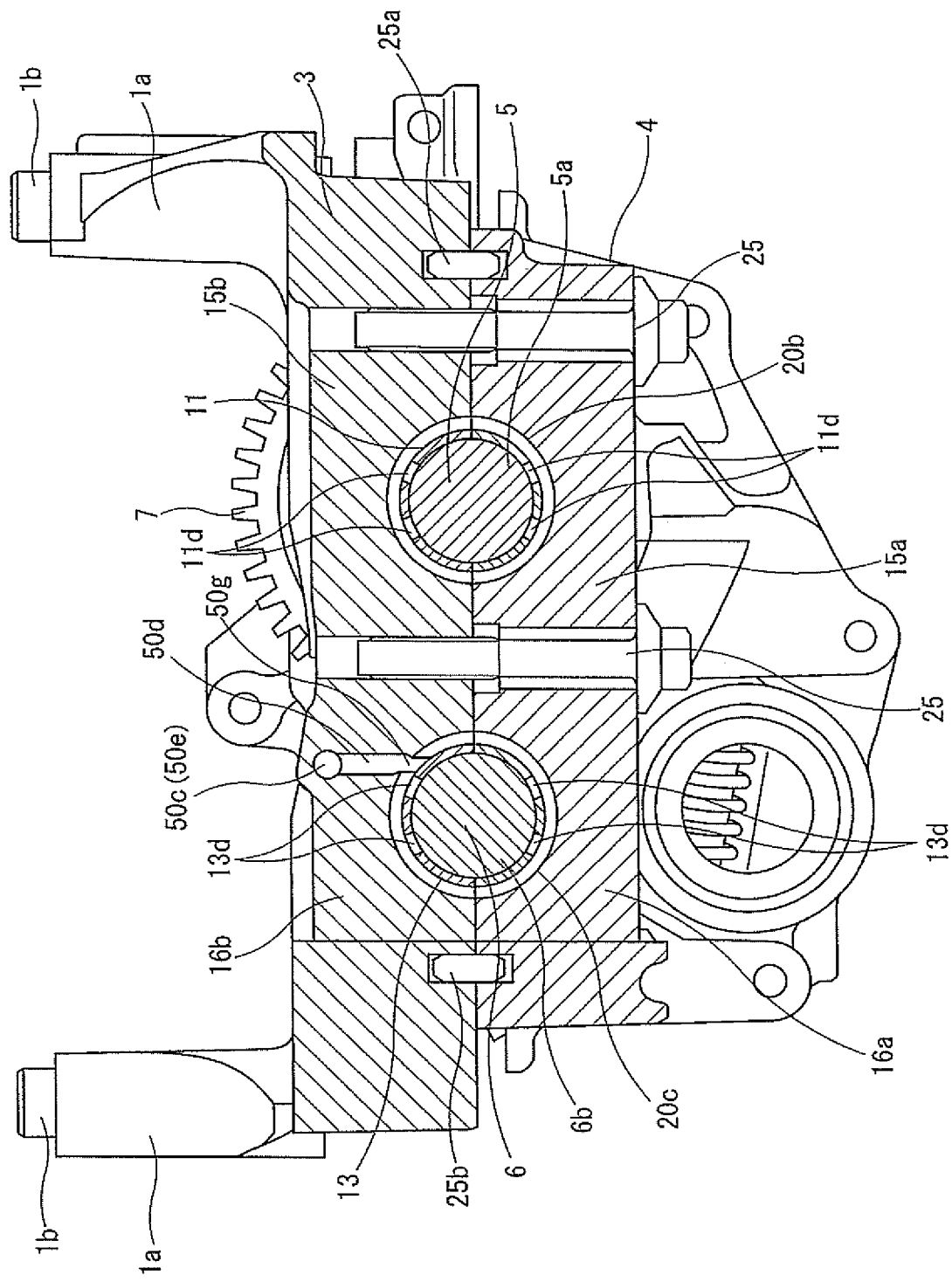
FIG. 6 is a sectional view of the balancer device, taken along a line A-A of FIG. 5.

FIG. 1 is a schematic view showing a state in which the balancer device according to a first embodiment is mounted to a lower portion of a cylinder block of an internal combustion engine. FIG. 2 is a perspective view showing a state in which an oil pump according to the present embodiment is fixed to the balancer device. FIG. 3 is a rear view of the oil pump and the balancer device of the present embodiment. FIG. 4 is a plan view of the balancer device of the present embodiment with an upper housing being removed. FIG. 5 is a plan view of the balancer device. FIG. 6 is a sectional view of the balancer device, taken along a line A-A of FIG. 5.

A balancer device 1 is accommodated in an oil pan 30 that is fixed to a lower portion of a cylinder block SE of an internal combustion engine E (in the present embodiment, an in-line four-cylinder engine). A rotation force is transmitted to the balancer device 1 from a crankshaft CS supported by the cylinder block SB and a bearing cap BC of the internal combustion engine E. This balancer device 1 is integrally provided with an oil pump 2. The oil pump 2 is configured to be driven by a rotation force transmitted from the balancer device 1.

The internal combustion engine B has a main oil gallery 10 as a second passage (an outflow portion or an oil-pouring portion) in the internal combustion engine E. As will be described later, oil stored in the oil pan 30 is pumped up and discharged by the oil pump 2, and is supplied to the main oil gallery 10 through an outlet passage 48 as an oil supply portion.

As shown in FIGS. 2 and 3, the balancer device 1 is fixed to a lower surface of the cylinder block SB of the internal combustion engine E with four fixing bolts (not shown) as fixing members through a plurality of leg portions (in the present embodiment, four leg portions) 1a. The four leg portions 1a are formed integrally with an upper surface of an after-mentioned upper housing 3, and each of the four leg portions 1a has a positioning hollow pin 1b that protrudes from an upper end of the leg portion 1a.

The balancer device 1 has the upper housing 3 and a lower housing 4 connected to an oil pan bottom side of the upper housing 3 with a plurality of connecting bolts 25 as connecting members. These upper and lower housings 3 and 4 are molded in aluminum alloy material as metal material. A drive shaft 5 and a driven shaft 6, which are a pair of balancer shafts arranged parallel to each other, are rotatably supported in an accommodation section formed between the both housings 3 and 4. At one end portion in a rotation axis direction of the drive shaft 5, a helical type drive gear 7 to which a rotation force is transmitted by engaging with a drive helical gear that is driven and rotated by the crankshaft CS is provided. In the present embodiment, as shown in FIG. 6, positioning of these upper housing 3 and lower housing 4 is made by two pins 25a and 25b.

Further, as shown in FIG. 4, a helical type drive gear 8 is fixed to the other end side in the rotation axis direction of the drive shaft 5 so as to be able to rotate integrally with the drive shaft 5. Moreover, a helical type driven gear 9 to which the rotation force is transmitted by engaging with the drive gear 8 is fixed to the driven shaft 6.

A balancer housing as a housing is formed by these upper housing 3 and lower housing 4.

The lower housing 4 is formed into a rectangular box shape that is substantially same as the upper housing 3. One end surface of the lower housing 4 is a flat fixing surface 28 to which the oil pump 2 is fixed. This fixing surface 28 has, at side portions thereof, a plurality of female screw holes (not shown, in the present embodiment, four female screw holes).

As shown in FIG. 4, the drive shaft 5 is supported at a pair of journal portions 5a and 5b located at both end sides in the rotation axis direction of the drive shaft 5 by a pair of plain bearings 11 and 12 as bearing portions (bearing metals) provided between the upper housing 3 and the lower housing 4.

The rotation force of the crankshaft is transmitted to the drive shaft 5 by the drive gear 7 provided at the one end portion of the drive shaft 5 being engaged with the drive helical gear (not shown). In this manner, when the drive shaft 5 is rotated, the drive shaft 5 and the driven shaft 6 rotate in opposite directions to each other at double the rotation speed of the crankshaft with the rotation of the drive shaft 5 being transmitted from the drive gear 8 fixed to the other end side of the drive shaft 5 to the driven shaft 6 through the driven gear 9 fixed to the driven shaft 6.

Further, a counter weight 5c is formed integrally with the drive shaft 5 in the rotation axis direction between the pair of journal portions 5a and 5b.

In the same manner as the drive shaft 5, the driven shaft 6 is supported at a pair of journal portions 6a and 6b formed at both end sides in a rotation axis direction of the driven shaft 6 by a pair of plain bearings 13 and 14 as bearing portions (bearing metals) provided between the upper housing 3 and the lower housing 4. Further, a counter weight 6c is formed integrally with the driven shaft 6 in the rotation axis direction between the pair of journal portions 6a and 6b.

As shown in FIGS. 4 and 6, each of the plain bearings 11 to 14 is formed into a pair of half-cut arc shapes at the both housing 3 and 4 sides, and has a cylindrical shape as a whole by coupling these half-cut arc portions at their opposing end portions. Further, the half-cut arc portions of the plain bearings 11 to 14 are placed in arc-shaped bearing grooves formed on opposing surfaces of a pair of upper and lower partition walls 15a, 15b, 16a and 16b provided between the upper housing 3 and the lower housing 4.

Figure 7:
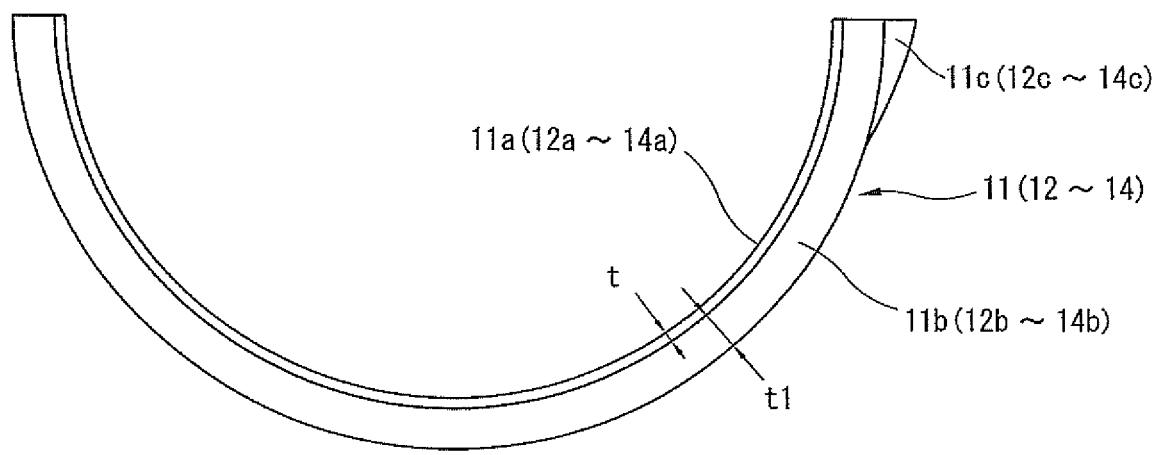
FIG. 7 is a side view of a plain bearing.

FIG. 7 is a side view of the lower side half-cut arc portion of each of the plain bearings 11 to 14.

As shown in FIG. 7, the plain bearings 11 to 14 each have a double layer structure formed by inner circumferential portions 11a to 14a and outer circumferential portions 11b to 14b. The inner circumferential portions 11a to 14a are made of material having, as a main component, aluminium alloy material that is a soft metal, whereas the outer circumferential portions 11b to 14b are made of iron base metal.

By forming the inner circumferential portions 11a to 14a with the material having the soft aluminium alloy material as a main component, contaminant such as metal wear particles trapped between inner circumferential surfaces of the inner circumferential portions 11a to 14a and outer circumferential surfaces of the journal portions 5a to 6b can be embedded or captured on the inner circumferential portions 11a to 14a.

Further, a thickness t of each of the inner circumferential portions 11a to 14a is set to approx. 0.2 mm, whereas a thickness t1 of each of the outer circumferential portions 11b to 14b is set to approx. 1.3 mm. Furthermore, on outer peripheral surfaces of the outer circumferential portions 11b to 14b, rotation stopper protrusions 11c to 14c to restrain or limit drag-rotation of the plain bearings 11 to 14 during rotation of the both shafts 5 and 6 are provided.

Moreover, as shown in FIGS. 4 and 6, passage grooves 17 and 18 to supply lubricating oil to each of the plain bearings 11 to 14 are formed on surfaces, facing to the lower housing 4, of the partition walls 15a, 15b, 16a and 16b.

These passage grooves 17 and 18 are connected to each other through one communication groove 19 that is formed on opposing surfaces of wall portions 3a and 4a connecting the partition walls 15 and 16 of the both housings 3 and 4. In FIG. 4, only the passage grooves 17 and 18 and the communication groove 19 on the lower housing 4 side are illustrated. However, these passage grooves 17 and 18 and communication groove 19 could be formed at only upper housing 3 side, or might be formed at both upper and lower housing sides.

One ends of the passage grooves 17 and 18 open to annular grooves 20a and 20b respectively which are formed on inner circumferential surfaces of the bearing grooves. On the other hand, the other ends of the passage grooves 17 and 18 are connected to the communication groove 19 through annular grooves 20c and 20d respectively. Each of the annular grooves 20a to 20d is formed at the substantially middle in a width direction of the inner circumferential surface of the bearing groove. Regarding these passage grooves 17 and 18 and communication groove 19, in a state in which the both upper and lower housing 3 and 4 are connected together from up-and-down directions with the connecting bolts 25, a passage is formed on opposing surfaces of the upper housing 3 and the lower housing 4.

The plain bearings 11 to 14 are provided, at predetermined positions on circumferential walls thereof, with communication openings 11d, 12d, 13d and 14d as oil vents which communicate with the annular grooves 20a to 20d respectively. Each of the plain bearings 11 to 14 has four communication openings (two communication openings per one half-cut arc portion of the plain bearing) on the same circumference line at the substantially middle in a width direction of the circumferential wall of the plain bearing. Oil is introduced into gaps between the inner circumferential surfaces of the inner circumferential portions 11a to 14a and the outer circumferential surfaces of the journal portions 5a to 6b through these communication openings 11d, 12d, 13d and 14d.

Further, a drive side helical gear 21, as an external gear, which has a smaller diameter than that of the drive gear 7, is fixed to one end portion 6d in the rotation axis direction of the driven shaft 6. This drive side helical gear 21 drives the oil pump 2.

Figure 8:
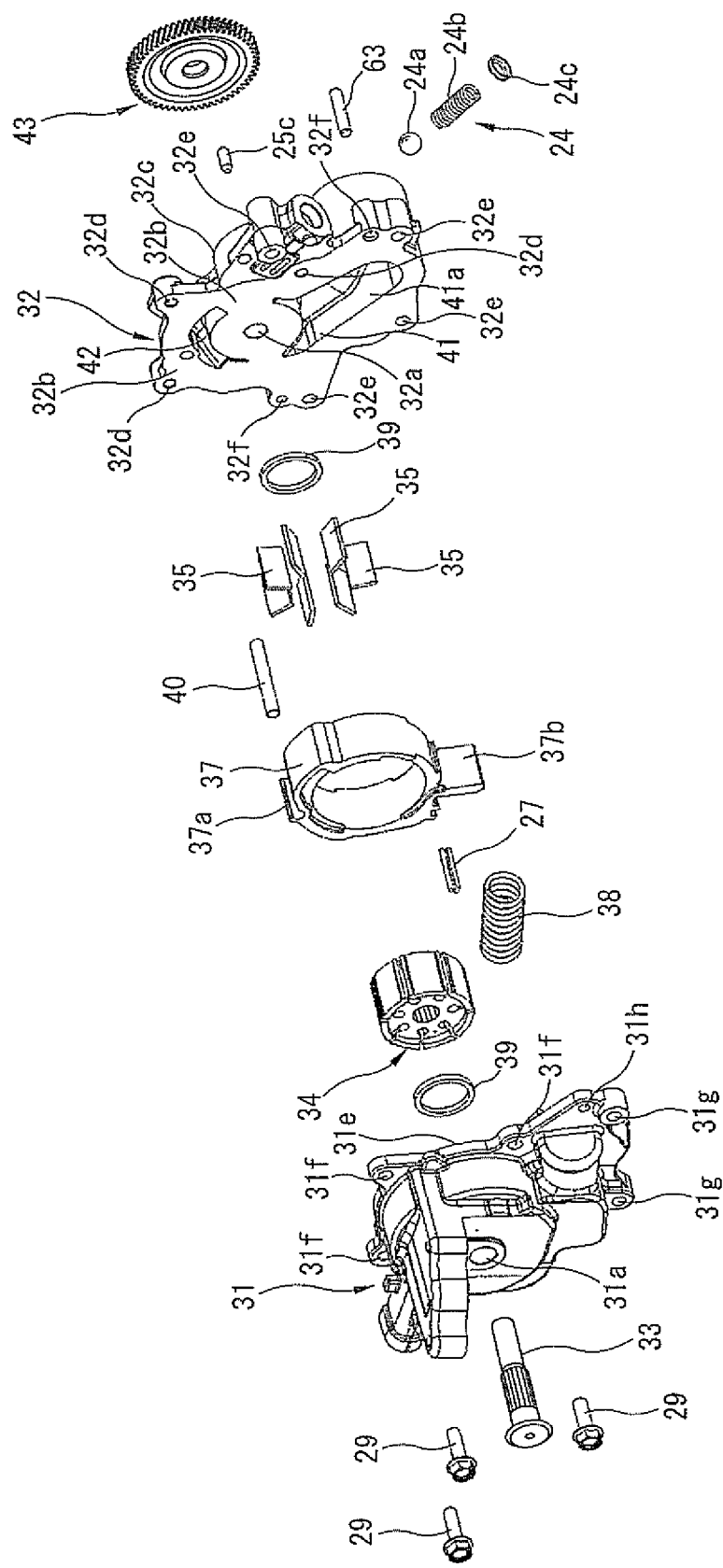
FIG. 8 is a perspective exploded view of the oil pump with components of the oil pump being dismantled.
Figure 9:
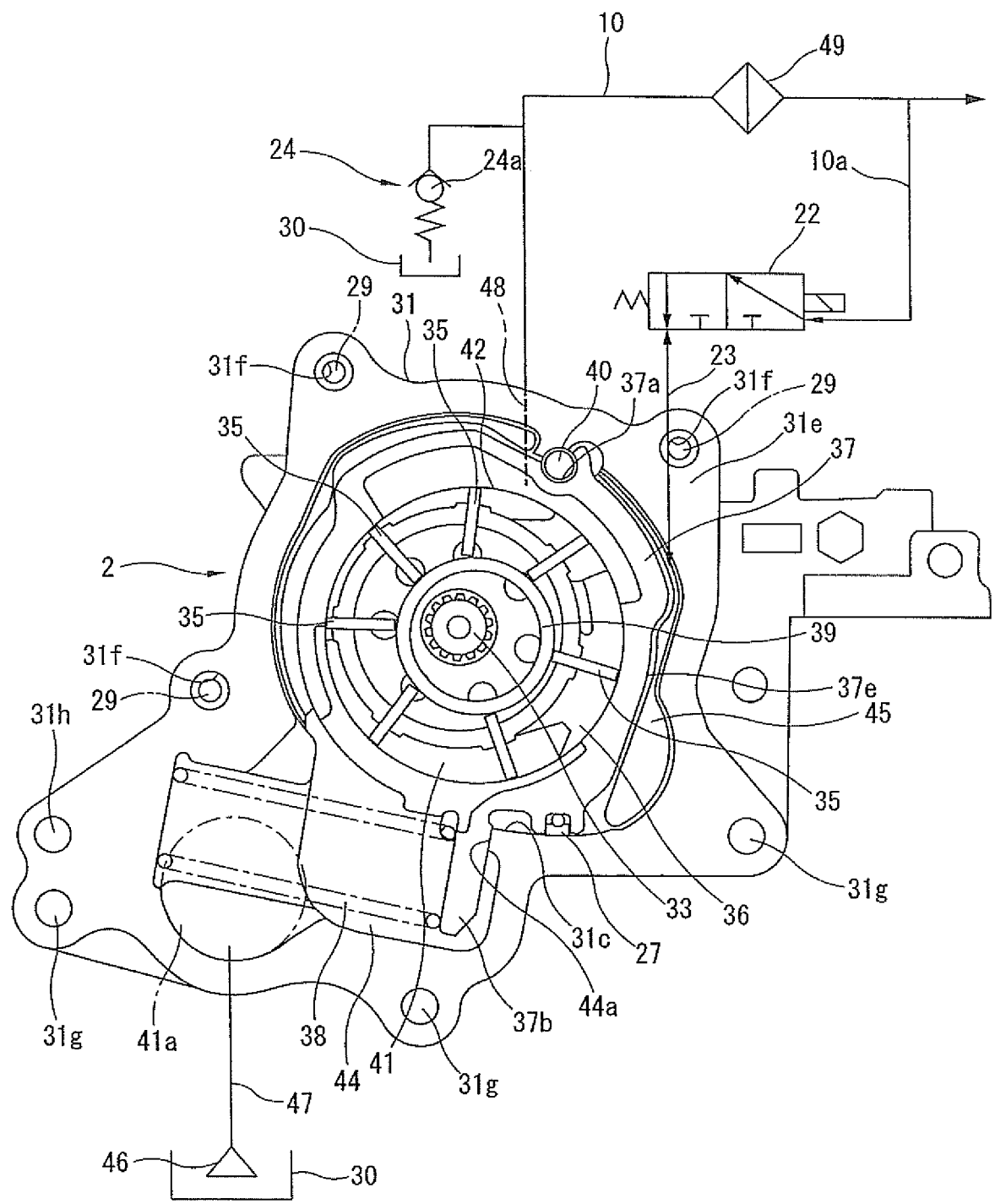
FIG. 9 is a front view of the oil pump with a cover member being removed.

FIG. 8 is a perspective exploded view of the oil pump with components of the oil pump being dismantled. FIG. 9 is a front view of the oil pump with a cover member 32 being removed.

The oil pump 2 is a typical variable displacement vane pump. Therefore, its structure will be simply explained below. A pump housing is fixed to the fixing surfaces 28 of the both housings 3 and 4 of the balancer device 1 with a plurality of bolts 26 (in the present embodiment, four bolts) as fixing members.

This pump housing is formed by a housing body 31 made of resin or metal material such as aluminium alloy material and a cover member 32 made of aluminium alloy material.

One end side of the housing body 31 is open, and a pump accommodation chamber having a square bracket shape in a longitudinal cross section is formed in the housing body 31. The cover member 32 is connected to the housing body 31 so as to cover an opening of the housing body 31. The cover member 32 is formed so as to be thinner than the housing body 31.

The oil pump 2 has a pump shaft 33, a rotor 34 and vanes 35. The pump shaft 33 is set at a substantially center portion of the pump accommodation chamber, and is rotatably supported by the housing body 31 and the cover member 32 with both end portions in a rotation axis direction of the pump shaft 33 penetrating the housing body 31 and the cover member 32 respectively. The rotor 34 is rotatably accommodated in the pump accommodation chamber. The rotor 34 is connected to the pump shaft 33 with its center portion fitted on or engaged with the pump shaft 33 by spline engagement. The vanes 35 are accommodated in a plurality of slots (in the present embodiment, seven slots), which are radially formed at an outer circumferential portion of the rotor 34 by being cut radially, so as to be able to extend from and retract into the slots.

The oil pump 2 further has a cam ring 37, a coil spring 38 as a forcing member and a pair of vane rings 39 and 39. The cam ring 37 is formed into a ring shape having a circular hole in its inner circumference. This hole of the cam ring 37 is formed so as to contact an outer peripheral side of each vane 35.

Further, the cam ring 37 is set so as to be able to rock. By this rocking movement of the cam ring 37, an eccentric amount of the hole of the cam ring 37 with respect to a rotation center of the rotor 34 can be changed. A plurality of pump chambers 36 are formed by an inner circumferential surface of the hole of the cam ring 37, an outer circumferential surface of the rotor 34 and the adjacent two vanes 35 and 35.

The coil spring 38 is accommodated in the housing body 31, and always forces the cam ring 37 in a direction in which the eccentric amount of a center of the hole of the cam ring 37 with respect to the rotation center of the rotor 34 is increased.

The vane rings 39 and 39 are set so that an edge, in the inner circumferential side of the rotor 34, of each vane 35 accommodated in the slot of the rotor 34 contacts the vane rings 39 and 39.

The cam ring 37, the pump shaft 33, the rotor 34 and the vanes 35 form the pump elements.

The housing body 31 has, at a substantially middle position on a bottom surface of the pump accommodation chamber, a bearing hole 31a that penetrates the bottom surface and rotatably supports one end portion of the pump shaft 33. The housing body 31 also has, on the bottom surface of the pump accommodation chamber, a pivot pin hole into which a pivot pin 40 is inserted. In addition, a pin groove is formed on an inner circumferential wall of the pump accommodation chamber so as to extend in an axis direction of the pivot pin 40.

Further, a seal sliding contact surface 31c on which an after-mentioned seal member 27 of the cam ring 37 slides is formed on the inner circumferential wall of the pump accommodation chamber.

The housing body 31 is provided, at boss portions formed at an outer peripheral side of the pump accommodation chamber, with a plurality of bolt insertion holes 31f (in the present embodiment, three bolt insertion holes). The housing body 31 and the cover member 32 are then connected to each other with a plurality of second bolts 29 (in the present embodiment, three bolts) as fixing members which are inserted into the bolt insertion holes 31f.

The housing body 31 is further provided with three bolt insertion holes 31g into which three of four bolts 26 are inserted. Moreover, the housing body 31 is provided, at a lower side thereof, with a positioning hole 31h into which a positioning pin 63 for making positioning with respect to the balancer device 1 together with the cover member 32 is inserted.

As shown in FIG. 8, the cover member 32 has, at positions facing or corresponding to the bearing hole 31a, a bearing hole 32a that penetrates the cover member 32 and rotatably supports the other end portion in the axis direction of the pump shaft 33. The cover member 32 also has an inner end side housing fixing surface 32b to which the housing body 31 is fixed and an outer end side balancer fixing surface 32c which contacts and is fixed to the fixing surface 28 of the balancer device 1.

The cover member 32 is provided, at an outer peripheral portion thereof, with three female screw holes 32d to which the three bolts 29 are fixed. The cover member 32 is further provided with four bolt insertion holes 32e which penetrate the cover member 32 and to which four bolts 26 are inserted.

The cover member 32 is provided with two positioning holes 32f which penetrate the cover member 32 and to which positioning pins 25c and 63 are inserted.

The housing body 31 and the cover member 32 each have, at outer peripheral sides of the opposing fixing surfaces 31e and 32b, an inlet port 41 as an inlet portion and an outlet port 42 as an outlet portion. The inlet port 41 is formed into an arc-shaped recess so as to be open in a region (a suction region) where inside volumes of the pump chambers 36 increase by and according to the pump operation of the pump elements. On the other hand, the outlet port 42 is formed into an arc-shaped recess so as to be open in a region (a discharge region) where the inside volumes of the pump chambers 36 decrease by and according to the pump operation of the pump elements. The inlet port 41 and the outlet port 42 are arranged at substantially opposite positions to each other with respect to the bearing holes 31a and 32a.

As shown in FIG. 9, an inlet hole 41a penetrating a bottom wall of the cover member 32 and opening to the outside is formed at an after-mentioned spring accommodation chamber 44 side in the inlet port 41. With this structure, the lubricating oil in the oil pan 30 is sucked into each pump chamber 36 of the suction region through a strainer 46, an inlet passage 47, the inlet hole 41a and the inlet port 41.

The outlet port 42 communicates with the outlet passage 48 penetrating a bottom wall of the housing body 31 and formed at the bottom wall of the housing body 31. This outlet passage 48 communicates with the main oil gallery 10 through a discharge hole 48a located at a downstream side of the outlet port 42. Here, the outlet passage 48 includes a part of the downstream side of the outlet port 42, i.e. a part between the outlet port 42 and the discharge hole 48a.

The main oil gallery 10 is configured to supply the oil to an oil jet injecting a cooling oil to a piston, a valve timing control device, a bearing of the crankshaft and so on.

The main oil gallery 10 is provided with an oil filter 49 that collects foreign substances existing in the oil pumped out from the outlet passage 48.

Further, a relief valve 24 that suppresses breakage of the oil filter 49 when a discharge pressure becomes excessive is provided in the outlet passage 48. This relief valve 24 is formed, as shown in FIG. 8, by a ball valve body 24a that opens and closes an opening end of a branch passage that branches off from the outlet passage 48, a coil spring 24b that forces the ball valve body 24a in a closing direction and an annular spring retainer 24c.

In addition, a supply passage 10a that supplies the oil to an after-mentioned control hydraulic chamber 45 through an electromagnetic switching valve 22 is formed so as to branch off from the main oil gallery 10.

A supply and exhaust passage 23 that introduces an oil pressure of the main oil gallery 10 into the control hydraulic chamber 45 through the supply passage 10a or exhausts an oil pressure of the control hydraulic chamber 45 into the oil pan 30 is connected to the electromagnetic switching valve 22. The electromagnetic switching valve 22 has a pilot port communicating with a pilot passage (not shown) that branches off from the supply passage 10a, a supply and exhaust port communicating with the supply and exhaust passage 23, a drain port connecting the supply and exhaust passage 23 and an exhaust passage and a supply port communicating with the supply passage 10a. The exhaust passage communicates with the oil pan 30.

A driven side helical gear 43 that is engaged with the drive side helical gear 21 is press-fitted onto one end portion, protruding from the bearing hole 32a, in the rotation axis direction of the pump shaft 33. Then, the rotation force of the driven shaft 6 is transmitted to the pump shaft 33 through the both helical gears 21 and 43.

The pump shaft 33 is set so that a rotation speed of the pump shaft 33 is substantially the same as the rotation speed (the number of revolutions) of the crankshaft by a speed reduction ratio between the drive side helical gear 21 and the driven side helical gear 43.

The rotor 34 has, at the middle thereof, an insertion hole which penetrates the rotor 34 and into which the pump shaft 33 is inserted. On an inner circumferential surface of this insertion hole, spline grooves are formed along the axis direction.

A movement of each vane 35 toward the inner circumferential side of the rotor 34 is limited or restrained by the vane rings 39 and 39. Therefore, the rotor 34 can move relative to the cam ring 37 and the vane rings 39 and 39 with each of the vanes 35 being in contact with the inner circumferential surface of the cam ring 37 and the outer circumferential surfaces of the vane rings 39 and 39.

The cam ring 37 is formed, as a single-piece component, into a cylindrical shape by molding and sintering iron base metal. The pivot pin 40 supported by a pivot groove 37a that is formed at an outer circumferential portion of the cam ring 37 and the pin groove that is formed on an inner circumferential wall of the housing body 31 forms a rocking fulcrum of the cam ring 37. The cam ring 37 has, at a position substantially opposite to the pivot groove 37a with respect to the center of the cam ring 37, an arm portion 37b that protrudes in the radial direction and works together with the coil spring 38.

Here, in the housing body 31, the coil spring 38 as the forcing member is accommodated in the spring accommodation chamber 44 that communicates with the pump accommodation chamber through the inlet hole 41a.

This coil spring 38 always forces the cam ring 37 in the direction in which the eccentric amount of the cam ring 37 with respect to the rotation center of the rotor 34 is increased (i.e. in a counterclockwise direction in FIG. 9) through the arm portion 37b by an elastic force based on the set load W. With this, the cam ring 37 is in a state in which an outer surface of the arm portion 37b is pressed against a stopper surface 44a that is formed on a wall surface of the spring accommodation chamber 44 by a spring force of the coil spring 38. In this state, the cam ring 37 is maintained at a position at which the eccentric amount of the cam ring 37 with respect to the rotation center of the rotor 34 is a maximum.

At the outer circumferential portion of the cam ring 37, the seal member 27 is accommodated and held in a seal holding groove that is formed so as to face the seal sliding contact surface 31c of the housing body 31.

The control hydraulic chamber 45 is provided in an outer circumferential region between the pivot groove 37a of the cam ring 37 and the seal member 27. This control hydraulic chamber 45 is partitioned or defined by an inner circumferential surface of the housing body 31, an outer circumferential surface of the cam ring 37, the pivot pin 40 and the seal member 27.

The control hydraulic chamber 45 communicates with the supply passage 10a through the supply and exhaust passage 23 and the electromagnetic switching valve 22. Therefore, the control hydraulic chamber 45 is supplied with the oil pressure from the main oil gallery 10 through the supply passage 10a, the electromagnetic switching valve 22 and the supply and exhaust passage 23. And also, an internal oil pressure of the control hydraulic chamber 45 is discharged through the supply and exhaust passage 23 and the electromagnetic switching valve 22.

The outer circumferential surface, facing the control hydraulic chamber 45, of the cam ring 37 is formed as a pressure receiving surface 37e. By the oil pressure from the supply passage 10a which this pressure receiving surface 37e receives, a rocking force (a movement force) in a direction in which the eccentric amount of the cam ring 37 with respect to the rotation center of the rotor 34 is decreased (i.e. in a clockwise direction in FIG. 9) is provided to the cam ring 37 against the urging force of the coil spring 38.

That is, by exerting the internal oil pressure of the control hydraulic chamber 45 on the cam ring 37 in the direction in which the eccentric amount of the cam ring 37 with respect to the rotation center of the rotor 34 is decreased, a moving amount control (a rocking amount control) in a concentric direction of the cam ring 37 is performed.

Here, a rocking position of the cam ring 37 is determined by balance of a predetermined force relation between an urging force in an eccentric direction of the cam ring 37 by the urging force of the coil spring 38 and an urging force by the internal oil pressure of the control hydraulic chamber 45.

The electromagnetic switching valve 22 is configured to generate a solenoid thrust force in proportion to a duty ratio by pulse current from a control unit and exert the thrust force on the three-direction valve in the same direction as the pilot pressure.

That is, when there is no current application (i.e. duty ratio is zero) by stopping the pulse current to a coil of the electromagnetic switching valve 22 from the control unit, no solenoid thrust force occurs, and a setting pressure determined by a spring force arises.

With this, since the communication between the supply and exhaust passage 23 and the supply and exhaust port is cut off and the supply and exhaust passage 23 communicates with the drain port by the three-direction valve, the internal oil pressure of the control hydraulic chamber 45 is discharged, then the control hydraulic chamber 45 is in a low pressure state.

When a signal of the current application is outputted from the control unit to the coil of the electromagnetic switching valve 22 and a current application (the duty ratio) increases, the solenoid thrust force is increase by and according to this increase in the current application (the duty ratio), and the pilot pressure is assisted. Therefore, the three-direction valve operates against the spring force in the electromagnetic switching valve 22, and the supply and exhaust port communicates with the supply port and does not communicate with the drain port. Thus, the electromagnetic switching valve 22 can operate at an oil pressure of the setting pressure or less of the spring force, and can constantly perform the control at a low oil pressure.

The internal oil pressure of the control hydraulic chamber 45 is therefore increased, and the cam ring 37 continuously moves (rocks) in the concentric direction against the spring force of the coil spring 38, then the pump discharge pressure is decreased.

The control unit controls operation of the electromagnetic switching valve 22 on the basis of an operating condition of the internal combustion engine such as an oil temperature and a water temperature in the engine, a rotation speed of the engine and a load of the engine and also an oil pressure information signal from an oil pressure sensor (not shown) provided at a downstream side of the oil filter 49 in the main oil gallery 10. That is, the electromagnetic switching valve 22 controls the oil pressure of the control hydraulic chamber 45 continuously and steplessly on the basis of the oil pressure information signal from the oil pressure sensor. With this control, fuel economy is increased.

Figure 10:
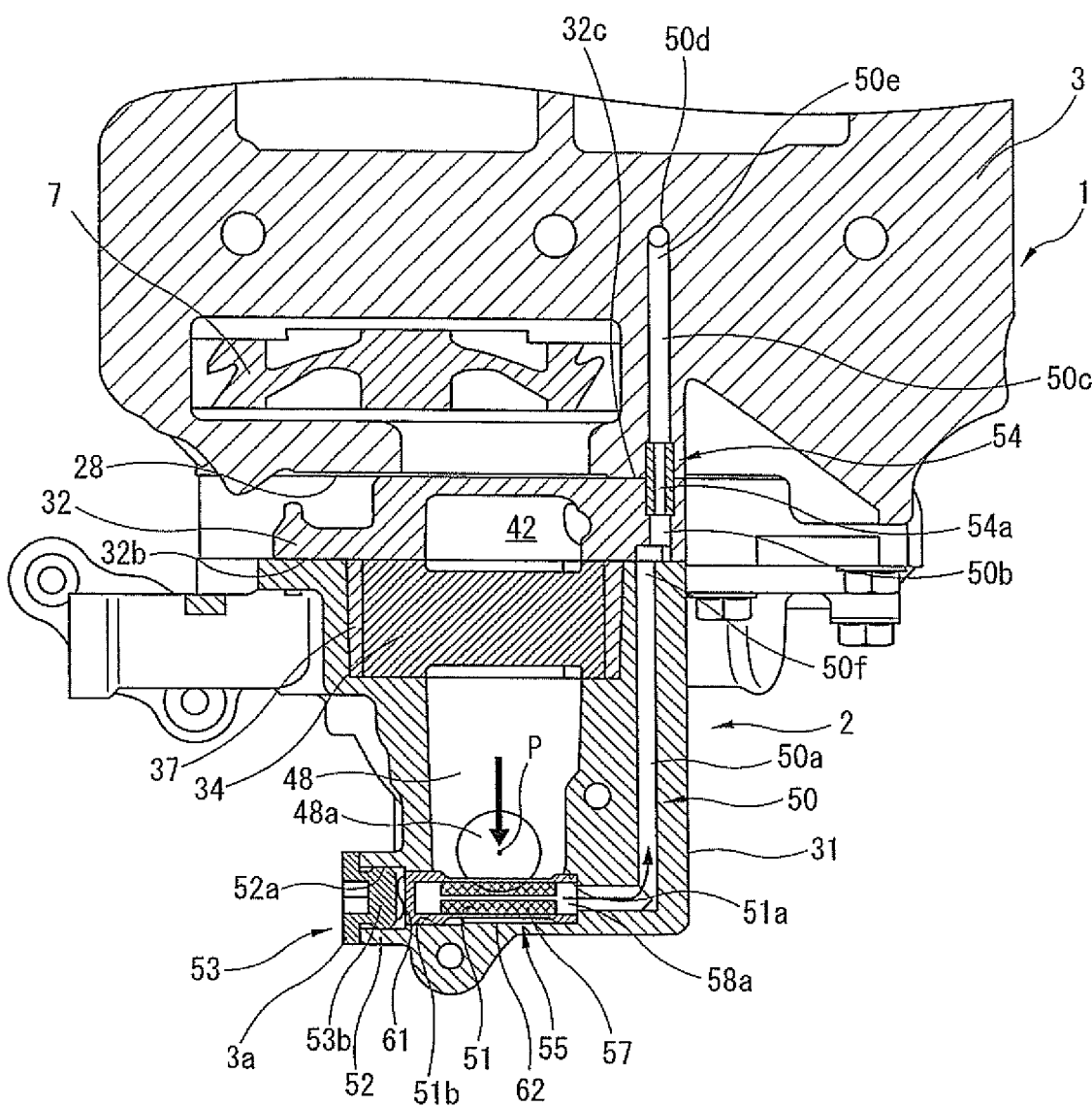
FIG. 10 is a sectional view of principal parts of the balancer device and the oil pump, taken along a line B-B of FIG. 3.

FIG. 10 is a plan view of the balancer device and the oil pump, with each part of the balancer device and the oil pump being cut along a line B-B of FIG. 3.

As shown in FIG. 10, a communication passage 50 as a first passage which branches off from the outlet passage 48 is formed in the housing body 31, the cover member 32 and the upper housing 3.

The communication passage 50 is set with the communication passage 50 branching off from a portion, located away from the outlet port 42, of the outlet passage 48. The outlet passage 48 is provided, on an inner surface of a branch portion with the communication passage 50, with a substantially cylindrical installation hole 51 in which a bearing filter 55 is installed.

As shown in FIGS. 10 and 6, the communication passage 50 is formed from a first communication part 50a bent into a substantially L-shape from the installation hole 51 side in the housing body 31, a second communication part 50b penetrating an inside of the cover member 32 along a width direction of the cover member 32, a third communication part 50c formed in the upper housing 3 along a substantially horizontal direction and a fourth communication part 50d formed in the lower housing 4 from an end portion in a downstream side of the third communication part 50c along a substantially vertical direction.

The installation hole 51 is placed at an inner peripheral surface of the outlet passage 48 in a direction crossing a flow direction of the oil that flows in the outlet passage 48. That is, the installation hole 51 is formed at the inner peripheral surface of the outlet passage 48 by two annular first and second installation holes 51a and 51b that are located between opposing surfaces in the direction crossing the oil flow direction. The direction crossing the oil flow direction is not necessarily a direction that is orthogonal to the oil flow direction, but includes a direction that crosses the oil flow direction at a slight inclination angle.

Further, as shown in FIG. 10, a position of the installation hole 51 is offset from an axial center P of the discharge hole 48a to a lower side of the drawing.

The first installation hole 51a located at a right side in FIG. 10 is formed so that its inside diameter is smaller than that of the second installation hole 51b located at a left side in FIG. 10. The second installation hole 51b is formed so that its outer end side opens to an inside of a cylindrical wall 52 that protrudes from an outer surface of the housing body 31.

This cylindrical wall 52 has, at an inner circumferential surface thereof, a female thread (a female screw hole) 52a into which a plug 53 can be screwed. The plug 53 is formed from a flange-shaped head portion 53a and a shaft portion 53b which is provided at the middle on one side surface of the head portion 53a and whose outer circumference has a male thread that is screwed on the female thread 52a. With this, the plug 53 can be removed from the cylindrical wall 52 through these male and female threads.

The first communication part 50a of the communication passage 50 has, at an upstream side thereof, short straight one end portion that is coaxial with the installation hole 51. The other end portion of the first communication part 50a, which is bent into the substantially L-shape from a downstream side of the one end portion, is formed into a relatively long straight shape toward the cover member 32 in the housing body 31. A top end opening 50f of the other end portion of the first communication part 50a faces to the cover member 32.

The second communication part 50b is bent into a crank shape from the top end opening 50f of the other end portion of the first communication part 50a, and a downstream side end portion of the second communication part 50b communicates with the third communication part 50c. Here, although the downstream side end portion of the second communication part 50b communicates with an upstream side end portion of the third communication part 50c, a throttle portion 54 is provided at a communication part between the both these communication parts 50b and 50c.

This throttle portion 54 is formed into a hollow pipe shape with metal material such as iron base metal, and has an orifice passage 54a in the throttle portion 54. The throttle portion 54 is detachably provided between the fixing surface 28 of the upper housing 3 and the opposing balancer fixing surface 32c of the cover member 32. That is, a cylindrical insertion hole is each provided at opposing end portions of the second communication part 50b facing the fixing surface 28 and the third communication part 50c facing the balancer fixing surface 32c. The throttle portion 54 is set so as to connect the both second and third communication parts 50b and 50c with its one end opening and its other end opening, formed by the orifice passage 54a, being detachably press-fixed into the respective insertion holes.

In the present embodiment, an inside diameter of the orifice passage 54a is smaller than that of the communication passage 50, and it is approx. 0.3 mm for example. With this inside diameter of the orifice passage 54a, an amount of the oil passing through the communication passage 50 is regulated. By properly changing the inside diameter of this orifice passage 54a, the oil flow amount can be arbitrarily set.

The third communication part 50c extends straight from its upstream end at the throttle portion 54 side, and an end portion 50e at a downstream side of the third communication part 50c is connected to an upstream side end portion of the fourth communication part 50d from a direction in which the third communication part 50c substantially crosses the upstream side end portion of the fourth communication part 50d.

The fourth communication part 50d is provided so that, as shown in FIG. 6, its downstream side end portion 50g is connected to the annular groove 20c at the driven shaft 6 side.

Accordingly, oil flowing into the annular groove 20c from the communication part 50a to 50d of the communication passage 50 flows into the passage groove 17, the communication groove 19 and the passage groove 18, then is supplied to the outer circumferential surfaces of the plain bearings 11 to 14. Further, the oil flows between the inner circumferential surfaces of the plain bearings 11 to 14 and the outer circumferential surfaces of the journal portions 5a, 5b 6a and 6b through the communication openings 11d, 12d, 13d and 14d. The inner and outer circumferential surfaces of the plain bearings 11 to 14 are then effectively lubricated.

Figure 11A:
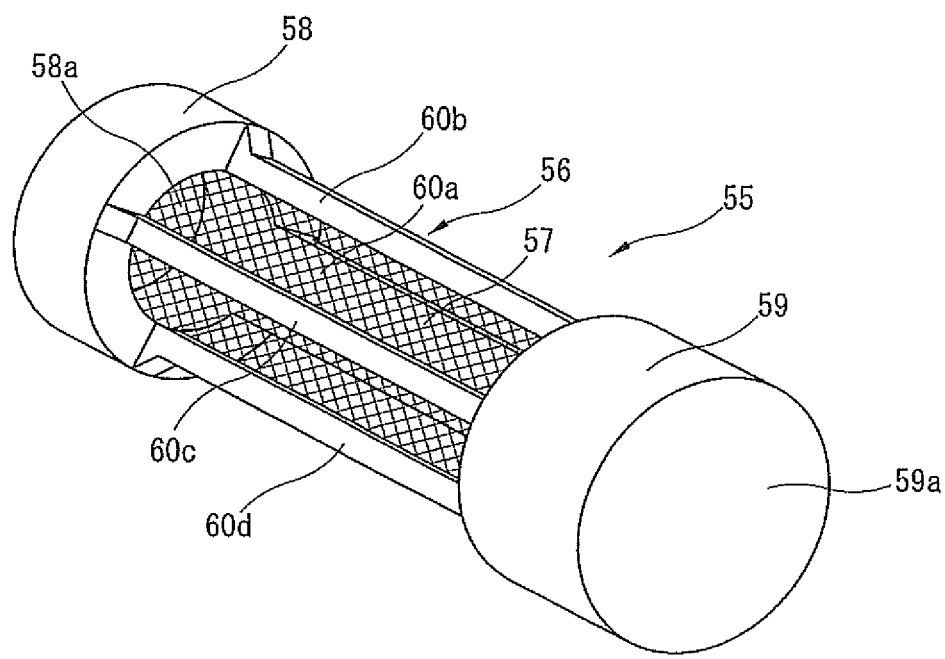
FIG. 11A is a perspective view of a bearing filter 55.
Figure 11B:
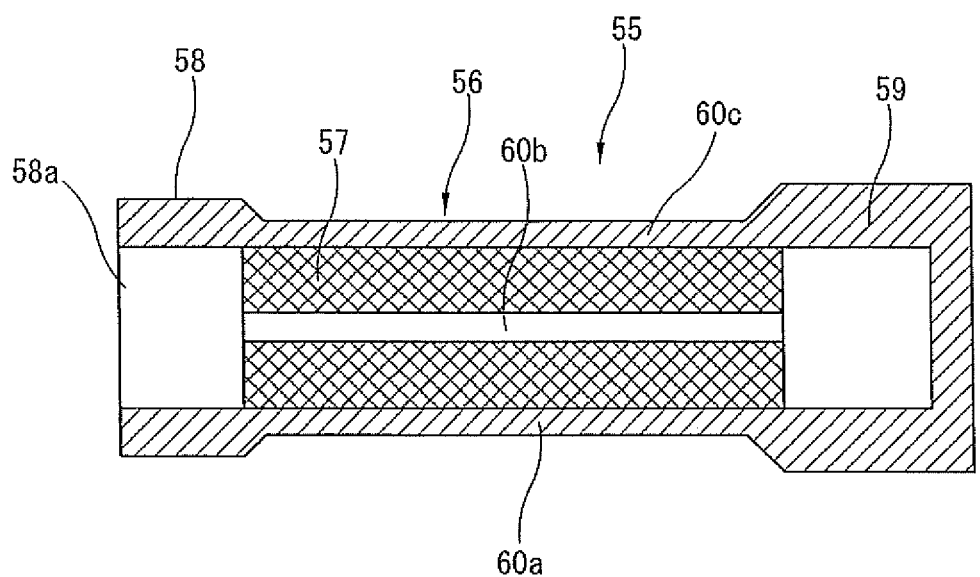
FIG. 11B is a vertically-cut cross section of the bearing filter 55.

FIG. 11A is a perspective view of a bearing filter 55. FIG. 11B is a vertically-cut cross section of the bearing filter 55.

As shown in FIGS. 11A and 11B, the bearing filter 55 is formed from a supporting frame 56 formed as a single-piece with synthetic resin material and a filter portion 57 as a filtering portion supported and fixed in the supporting frame 56.

The supporting frame 56 as a whole has a substantially cylindrical shape. The supporting frame 56 has first and second cylindrical portions 58 and 59 that are provided at both end portions in an axial direction of the supporting frame 56 and supported in the first and second installation holes 51a and 51b respectively and four frame portions 60a, 60b, 60c and 60d that connect opposing end edges of the both cylindrical portions 58 and 59.

The first cylindrical portion 58 located at one end side is formed so that its outside diameter is smaller than that of the second cylindrical portion 59 located at the other end side and also its length in the axial direction is shorter than that of the second cylindrical portion 59. The first cylindrical portion 58 has an opening 58a penetrating an inside of the first cylindrical portion 58. This opening 58a communicates with the upstream side one end portion of the first communication part 50a from the axial direction.

The first cylindrical portion 58 can be inserted into the first installation hole 51a from the axial direction. In a state in which the first cylindrical portion 58 is inserted into the first installation hole 51a, a top end surface of the first cylindrical portion 58 contacts an annular bottom surface of the first installation hole 51a, then insertion of the first cylindrical portion 58 more than this contact is limited.

The second cylindrical portion 59 is formed into a closed-bottomed shape with a disk-shaped bottom wall 59a formed at an outer end port ion of the second cylindrical portion 59. The second cylindrical portion 59 can be inserted into the second installation hole 51b with its outer circumferential surface being in substantially close contact with an inner circumferential surface of the second installation hole 51b.

The frame portions 60a to 60d are formed so that their both end edges are integrally connected with opposing inner surfaces of the cylindrical portions 58 and 59, and an inside diameter as a whole formed by these frame portions 60a to 60d is the substantially same as those of the cylindrical portions 58 and 59. Each of the frame portions 60a to 60d has a long narrow shape in order for the filter portion 57 to be adequately exposed, but each of the frame portions 60a to 60d has a wide width. This is because when fixing the filter portion 57 in the supporting frame 56 with resin mold, the filter portion 57 is molded with facing end portions of the rolled cylindrical filter portion 57 being butt-joined in the frame portion 60a. That is, a butt-portion is embedded in the frame portion 60a. With this, oil leak from the butt-portion of the filter portion 57 is suppressed.

The filter portion 57 is formed into a mesh with metal material or a synthetic resin material, and its mesh size is around No. 80 (opening 0.198 mm). This is a coarse mesh size as compared with a mesh size 0.01 to 0.02 mm of the oil filter 49 provided in the main oil gallery 10 which has a high filtering performance, and an occurrence of pressure loss (flow resistance) when the oil flows is suppressed.

Between an outer surface of the bottom wall 59a of the second cylindrical portion 59 and a top end surface of the shaft portion 53b of the plug 53, a wave spring 61 that presses the bearing filter 55 against an inner end surface of the first installation hole 51a is provided.

When installing the bearing filter 55 in the installation hole 51, first, the bearing filter 55 is inserted into the installation hole 51 from an outer end opening of the cylindrical wall 52 and held in the installation hole 51.

After the insertion, the wave spring 61 is set inside the cylindrical wall 52 and the plug 53 is screwed through the male and female threads. With this, the bearing filter 55 is set so that an outer end surface of the first cylindrical portion 58 is elastically pressed against the inner end surface of the first installation hole 51a from the axial direction by a spring force of the wave spring 61. With this structure, the bearing filter 55 is stably supported by the spring force of the wave spring 61. The bearing filter 55 is detachable by the removable plug 53.

In a state in which the bearing filter 55 is installed in the installation hole 51, as shown in FIG. 10, the bearing filter 55 is offset from the axial center P of the discharge hole 48a to the lower side of the drawing. Therefore, the bearing filter 55 is placed so that a part, at an upper side in the drawing, of a substantially middle position of the filter portion 57 overlaps a part, at a lower side in the drawing, of a surface of projection of the discharge hole 48a.

Further, in the state in which the bearing filter 55 is installed in the installation hole 51, a hemicylindrical annular passage 62 as a space portion is formed between an outer peripheral surface, at the filter portion 57 side, of the bearing filter 55 and the inner circumferential surface of the installation hole 51.

[Operation of Oil Pump in the Present Embodiment]

Operation of the oil pump 2 (the variable displacement pump) according to the present embodiment will be briefly explained with reference to FIG. 9.

In a low rotation operating condition such as an idling operation from an engine start, the drive shaft 5 of the balancer device 1 receives the rotation force of the crankshaft, and the driven shaft 6 is driven and rotated through the drive gear 8 and the driven gear 9. The rotation force is then transmitted from the drive side helical gear 21 of the driven shaft 6 to the driven side helical gear 43 of the pump shaft 33, and the pump shaft 33 is driven and rotated, then the oil pump 2 performs the pump operation by the pump elements. In this state, the coil of the electromagnetic switching valve 22 is in a no current application state. Therefore, in the electromagnetic switching valve 22, the supply and exhaust passage 23, the supply and exhaust port and the drain port are communicate with each other, but the supply port is closed.

With this, the internal oil pressure of the control hydraulic chamber 45 becomes low. Therefore, the cam ring 37 is maintained at a maximum eccentric amount position with respect to the rotation center of the rotor 34 by the spring force of the coil spring 38. That is, in a state of this engine rotation speed, discharge pressure characteristics of the oil pump are controlled so that the discharge pressure and a discharge flow amount are increased by and according to increase in the engine rotation speed.

Next, in an operating condition in which the engine rotation speed increases and the engine load and the oil temperature increase then an operation of the oil jet injecting the oil to the piston is required, the electromagnetic switching valve 22 is energized by the signal from the control unit. With this, an assist force is exerted on the pilot pressure, and the supply port and the supply and exhaust port communicate with each other by the three-direction valve, and the drain port is closed.

Therefore, the oil pressure of the main oil gallery 10 is supplied into the control hydraulic chamber 45 through the supply passage 10a, the electromagnetic switching valve 22 and the supply and exhaust passage 23, and the internal oil pressure of the control hydraulic chamber 45 is increased. The cam ring 37 continuously moves (rocks) from the maximum eccentric position with respect to the rotation center of the rotor 34 shown in FIG. 9 to a left side in FIG. 9 by and according to the increase in the internal oil pressure of the control hydraulic chamber 45 against the spring force of the coil spring 38, and the eccentric amount of the cam ring 37 with respect to the rotation center of the rotor 34 is decreased. With this, the oil pump is controlled so that increase in the discharge pressure and the discharge flow amount by and according to the engine rotation speed is suppressed.

In the present embodiment, as described above, although the oil discharged from the outlet port 42 of the oil pump 2 mostly flows to the main oil gallery 10 side from the outlet passage 48 without passing through the bearing filter 55, a part of the oil flows into the first communication part 50a from the opening 58a of the first cylindrical portion 58 through the filter portion 57.

That is, as shown by a bold arrow in FIG. 10, the oil flowing into the outlet passage 48 from the outlet port 42 mostly flows into the main oil gallery 10 through the oil filter 49 without being filtered by the filter portion 57. On the other hand, as shown by a narrow arrow in FIG. 10, the oil passing through the filter portion 57 and filtered by the filter portion 57 flows into the annular groove 20c from the fourth communication part 50d through the first communication part 50a, the second communication part 50b, the throttle portion 54 and the third communication part 50c.

This oil flowing into the annular groove 20c flows into other annular grooves 20a, 20b and 20d through the passage groove 17, the communication groove 19 and the passage groove 18. Further, a part of the oil flows to the respective inner circumferential surfaces of the plain bearings 11 to 14 through the communication openings 11d to 14d.

Accordingly, lubrication of the plain bearings 11 to 14, i.e. lubrication between the outer circumferential surfaces of the plain bearings 11 to 14 and the inner circumferential surfaces of the bearing grooves of the partition walls 15 and 16 and also between the inner circumferential surfaces of the plain bearings 11 to 14 and the outer circumferential surfaces of the journal portions 5a, 5b 6a and 6b, is made adequately and actively. Smooth rotation of each of the shafts 5 and 6 can therefore be obtained, and also durability of each of the plain bearings 11 to 14 can be increased.

Further, the oil flowing into the communication passage 50 from the outlet passage 48 is adequately filtered by the filter portion 57 of the bearing filter 55. It is therefore possible to prevent the so-called contaminant from flowing to the plain bearings 11 to 14. Here, the contaminant passing through the filter portion 57 is embedded or captured on the inner circumferential surfaces of the plain bearings 11 to 14.

Since the mesh size of the filter portion 57 is relatively large (relatively coarse) as mentioned above, the flow resistance of oil is small, and an oil supply performance into the communication pas sage 50 is increased. And also, it is possible to prevent the bearing filter 55 (the filter portion 57) from being clogged with the contaminant.

The bearing filter 55 is placed in the direction crossing the oil flow direction in the outlet passage 48, and a part of the filter portion 57 merely overlaps the surface of projection of the discharge hole 48a. Therefore, although the oil discharged from the outlet port 42 flows and strikes a part of an outer peripheral surface of the filter portion 57, the oil flows in an arc-shaped direction along the outer peripheral surface of the filter portion 57 then flows to the discharge hole 48a side. As a consequence, the contaminant trapped by the filter portion 57 is washed away by a fluid pressure of the oil, thereby further preventing the filter portion 57 from being clogged.

Further, since the filter portion 57 is shaped into the cylindrical shape, a large surface area can be secured with a small space. Therefore, regardless of how the bearing filter 55 is placed in the communication passage 50, a section that crosses the oil flow direction in the outlet passage 48 can be small. This reduces a tendency for the filter portion 57 to be clogged.

Moreover, a part of the oil flowing to the bearing filter 55 side from the outlet passage 48 flows in the annular passage 62. Then, when this oil passes through the annular passage 62, this oil washes away and clear away the contaminant trapped by the filter portion 57. Adhesion or accumulation of the contaminant to or on the outer peripheral surface of the filter portion 57 can thus be suppressed.

In the state in which the bearing filter 55 is installed in the installation hole 51, the top end surface of the first cylindrical portion 58 of the bearing filter 55 is pressed against the inner end surface of the first installation hole 51a by the wave spring 61 from the axial direction. With this structure, the top end surface of the first cylindrical portion 58 and the inner end surface of the first installation hole 51a are in close contact with each other, thereby increasing a sealing performance. Oil leak from an outer peripheral surface of the first cylindrical portion 58 to the communication passage 50 can be suppressed.

In addition, forming of the annular passage 62 can facilitate reception of a dynamic pressure of the oil flowing in the outlet passage 48 by the whole of the filter portion 57, and also the annular passage 62 can guide the oil to a downstream side of the outlet passage 48. This can further reduce the tendency for the filter portion 57 to be clogged.

It is essential for the plain bearings 11 to 14, which are the bearings of the present invention, to be supplied with the lubricating oil, and durability of the plain bearings 11 to 14 considerably decreases due to inflow of the contaminant. Therefore, as described in the present embodiment, the adequate and active supply of the oil in which the contaminant is removed brings about a beneficial effect.

In the present embodiment, since the oil amount can be regulated by the throttle portion 54 provided at a certain point of the communication passage 50, an amount of the oil supplied to each of the plain bearings 11 to 14 can be properly controlled. Further, presence of this throttle portion 54 can suppress the oil leak from a boundary between the opposing surfaces of the upper housing 3 and the cover member 32.

The throttle portion 54 is detachably fixed. Therefore, the throttle portion 54 can be freely replaced if necessary.

The throttle portion 54 also has a function of making positioning between the upper housing 3 and the cover member 32.

The bearing filter 55 and the wave spring 61 are detachably installed through the plug 53. Therefore, the bearing filter 55 and the wave spring 61 can be freely replaced if necessary.

The throttle portion 54 is not limited to the hollow pipe. The throttle portion 54 could be replaced with a manner that narrows a passage cross section of any of the communication parts by swelling an inner circumferential surface of that communication part inwards. Further, it might be a manner that narrows a passage cross section of any of the communication parts by intentionally shifting a contact portion between the top end opening 50f of the other end portion of the first communication part 50a and the second communication part 50b or a contact portion between the second communication part 50b and the third communication part 50c. Here, the hollow pipe could be a bent hollow pipe depending on positions of the cylindrical insertion holes formed on the fixing surface 28 of the upper housing 3 and the balancer fixing surface 32c of the cover member 32.

In the present embodiment, the communication passage 50 is provided as a short passage formed inside the oil pump 2 and inside the balancer device 1 without through the main oil gallery 10. This structure can eliminate the need to provide an oil passage from the main oil gallery 10 to the balancer device 1, then an entire oil passage structure of the engine can be simplified, thereby reducing an entire manufacturing cost of the internal combustion engine.

Second Embodiment

FIGS. 12 to 15 show a second embodiment in which the bearing filter 55 is used as a valve body of the relief valve 24.

Figure 12:
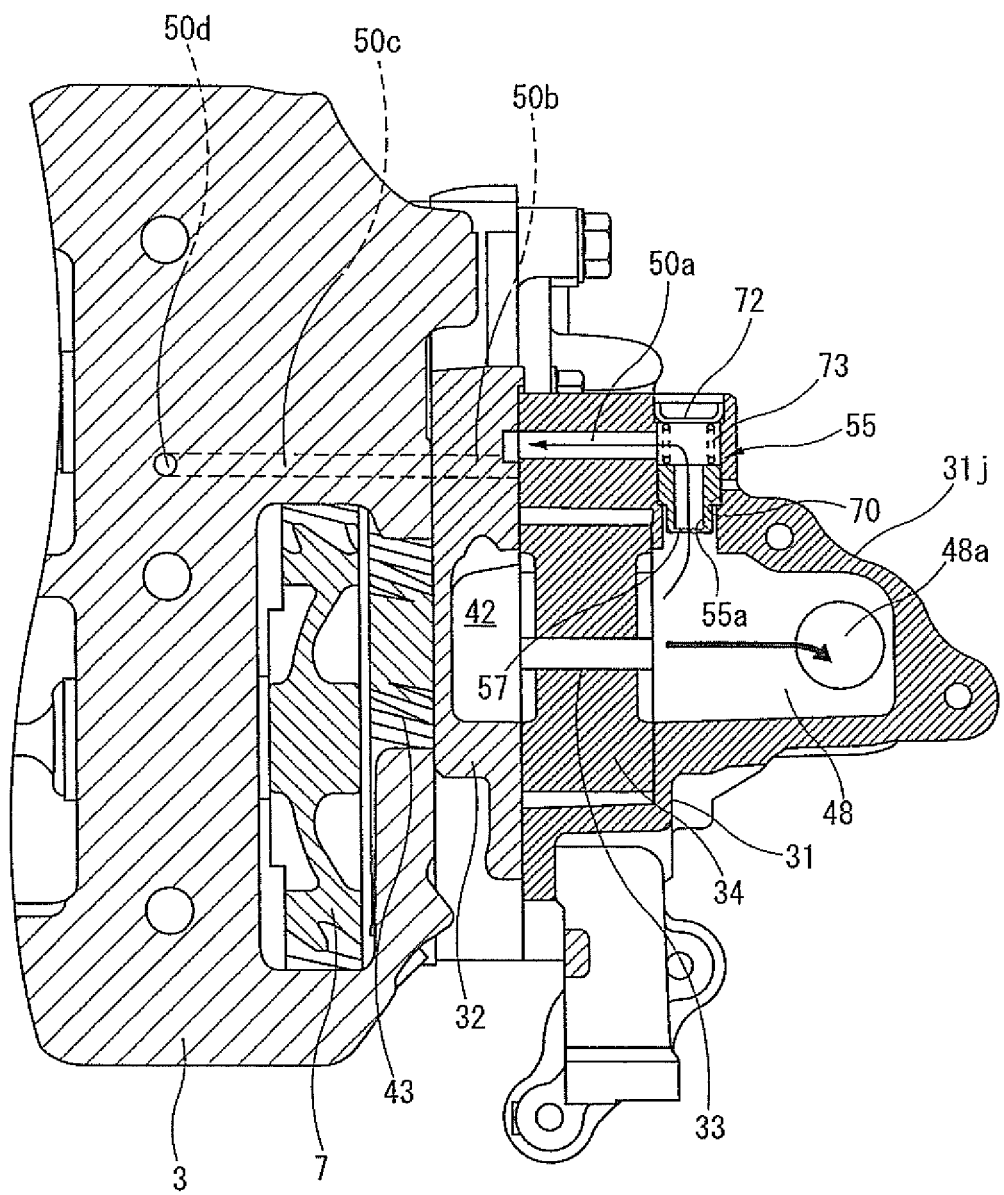
FIG. 12 is a sectional view of the upper housing and the oil pump according to a second embodiment.
Figure 13:
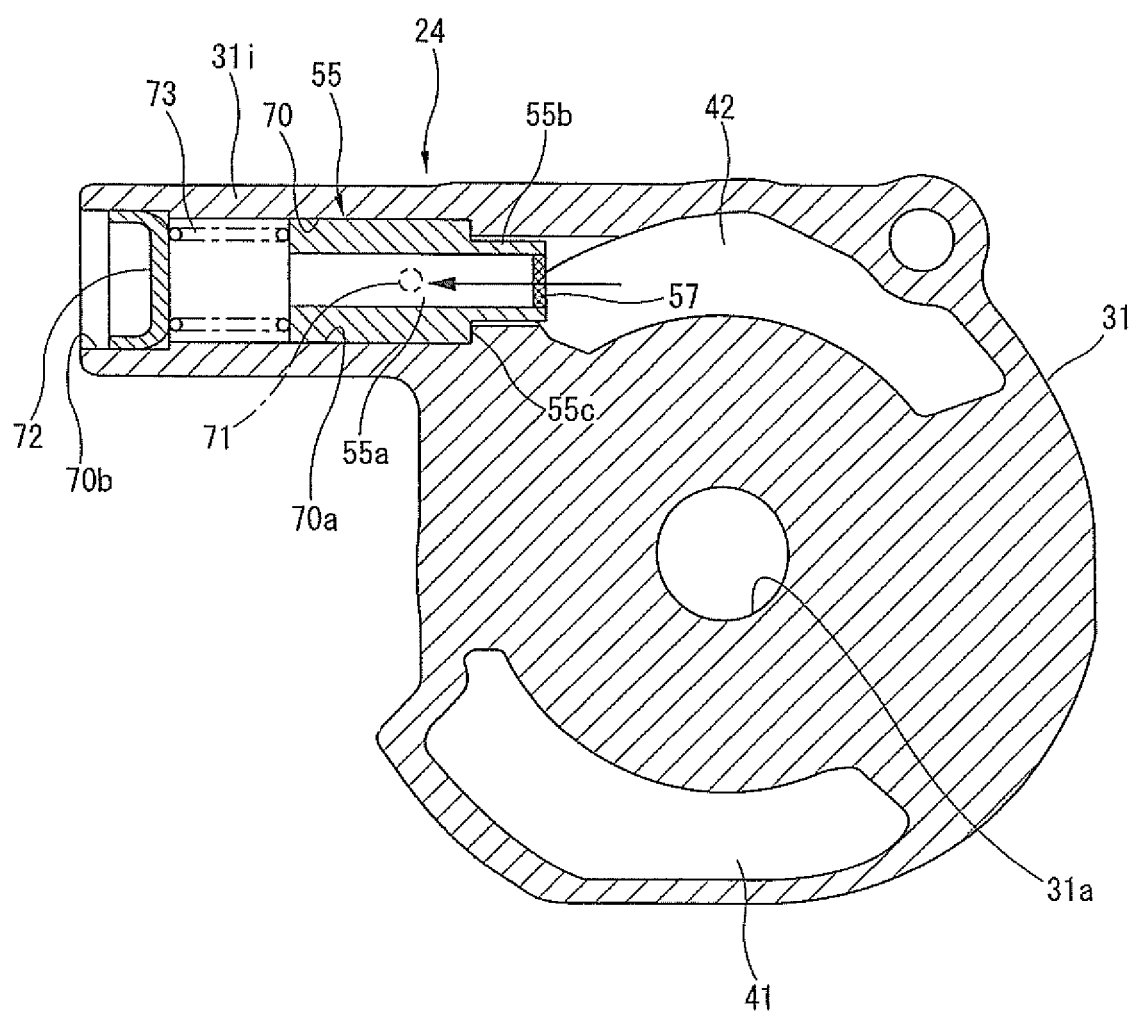
FIG. 13 is a sectional view of a principal part of a housing body of the oil pump 2 of the present embodiment.
Figure 14:
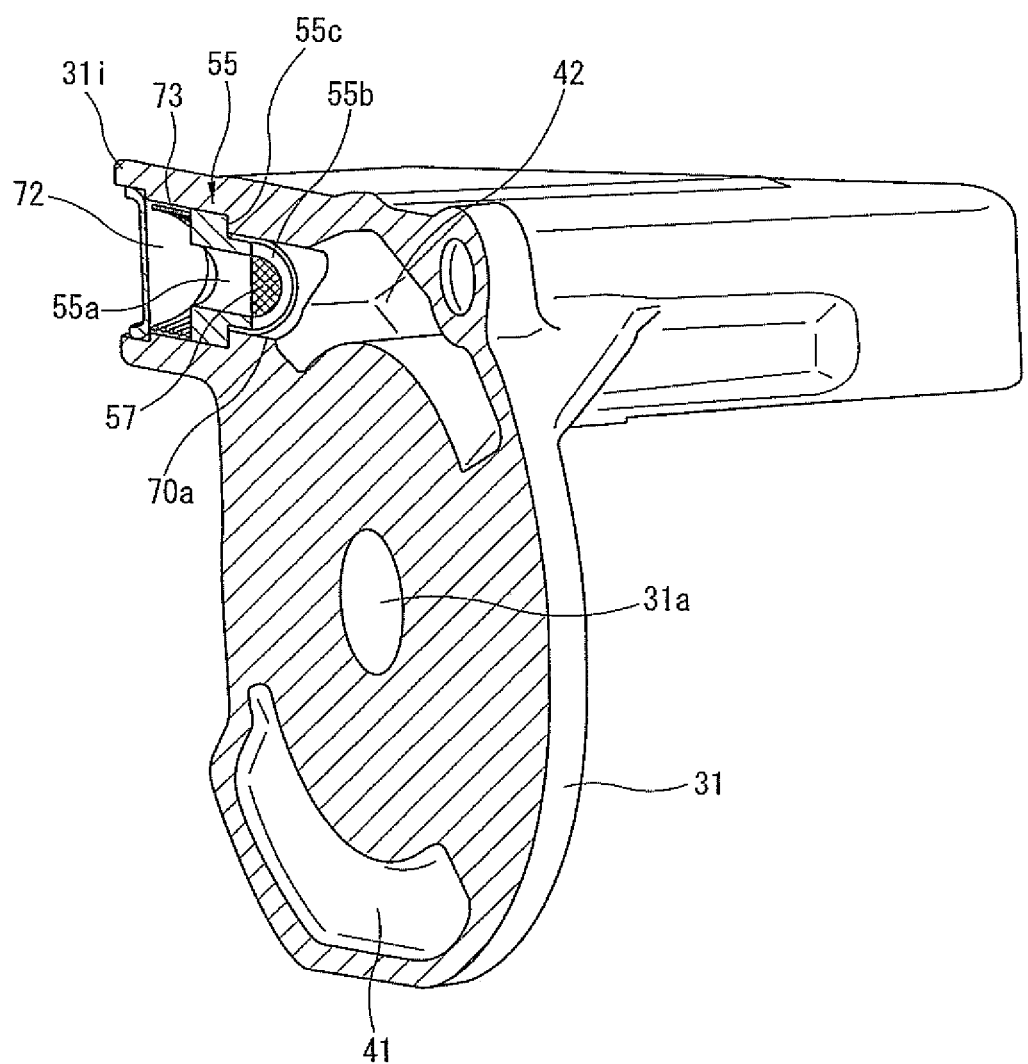
FIG. 14 is a perspective view of the housing body of the present embodiment with a part of the housing body being cut.
Figure 15:
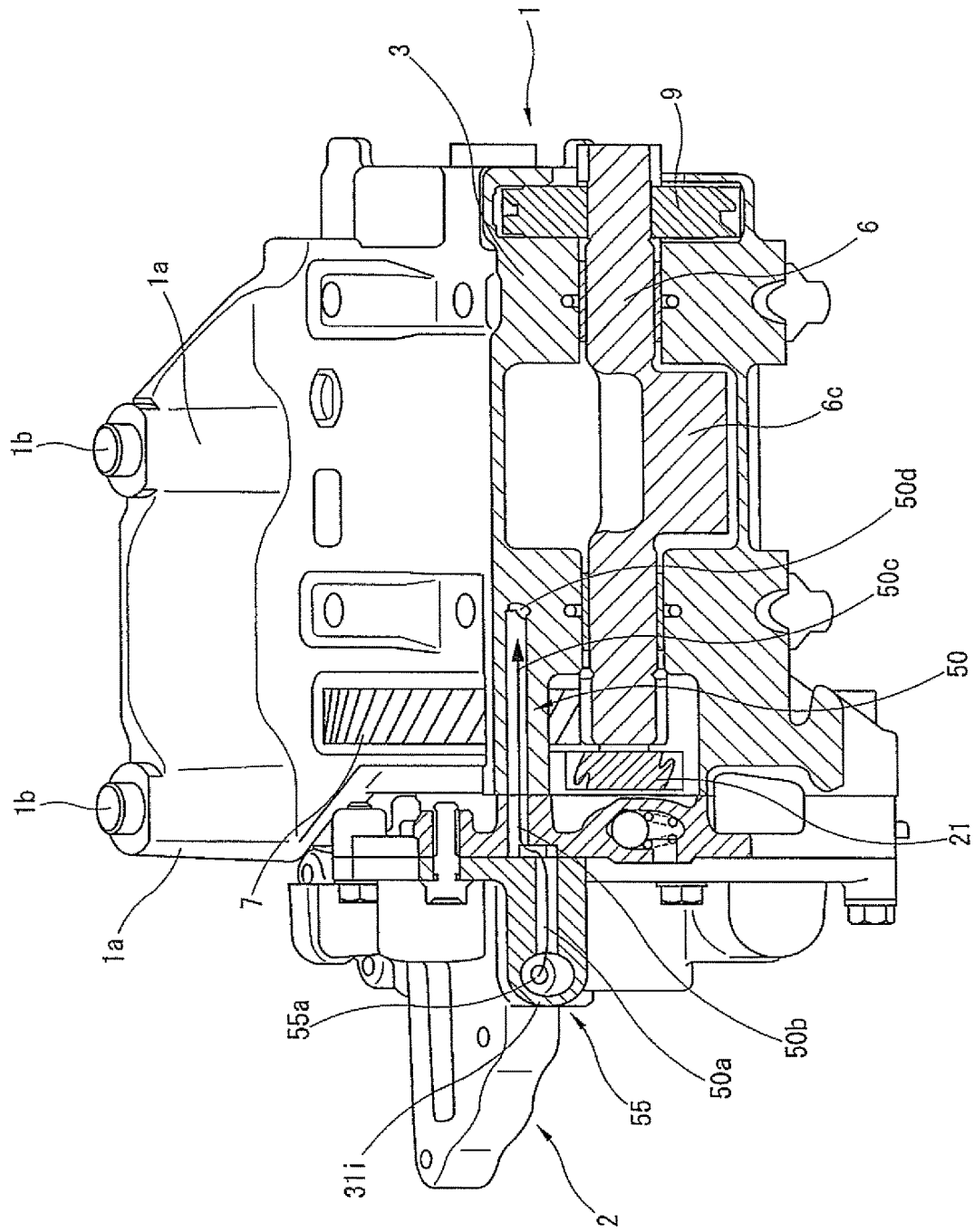
FIG. 15 is a drawing showing a passage structure of a communication passage with parts of the housing body, the cover member and the upper housing being cut.

FIG. 12 is a plan view of principal parts of the housing body 31, the cover member 32 and the upper housing 3, with these housing body 31, cover member 32 and upper housing 3 being cut. FIG. 13 is a sectional view of a principal part of the housing body 31 of the oil pump 2. FIG. 14 is a perspective view of the housing body 31 with a part of the housing body 31 being cut. FIG. 15 is a drawing showing a passage structure of the communication passage 50 with parts of the housing body 31, the cover member 32 and the upper housing 3 being cut.

That is, a relief passage 70 as a second passage is formed in the housing body 31 and the cover member 32 of the pump housing. This relief passage 70 is formed in a cylindrical wall 31i that is formed at an outer side portion, at the outlet port 42 side, of the housing body 31. The relief passage 70 directly communicates with the outlet port 42, and is an installation hole that forms a part of the outlet passage 48. That is, the bearing filter 55 is installed in the relief passage 70.

The relief passage 70 (the installation hole) is formed in a direction orthogonal to a flow direction of oil that flows into the discharge hole 48a of the outlet passage 48 from the outlet port 42. Here, the direction orthogonal to the oil flow direction is not necessarily a right angle, but includes a direction that forms a predetermined angle with respect to the flow of the oil flowing into the discharge hole 48a.

A stepped annular protruding portion 70a is formed on an inner periphery of one end portion, at the outlet port 42 side, of the cylindrical wall 31i. Further, a stepped large-diameter annular recessed portion 70b is formed around an opening of the other end portion, at an opposite side to the outlet port 42, of the cylindrical wall 31i. As shown in FIG. 14, the annular protruding portion 70a is formed so as to have a larger diameter than that of a small diameter portion 55b of the bearing filter 55 so that an oil pressure acts on an after-mentioned pressure receiving surface 55c of the bearing filter 55.

Further, a drain hole 71 that connects the relief passage 70 and the outside (an inside of the oil pan 30) is formed on a side wall, at the outlet port 42 side, of the cylindrical wall 31i.

A downstream side (the other end portion side of the cylindrical wall 31i) of the relief passage 70 communicates with the communication passage 50 formed and extending in the housing body 31, the cover member 32 and the upper housing 3.

As shown in FIGS. 12 and 15, this communication passage 50 is formed from a first communication part 50a, a second communication part 50b, a third communication part 50c and a fourth communication part 50d.

The first communication part 50a is formed in the housing body 31, and its one end portion opens to a rear end side portion, at an opposite side to the outlet port 42, of the relief passage 70. The second communication part 50b is formed so as to penetrate an inside of the cover member 32 along a width direction of the cover member 32, and its one end portion communicates with the other end portion of the first communication part 50a stepwise. The third communication part 50c is formed in the upper housing 3 along a substantially horizontal direction, and its one end portion communicates with the second communication part 50b. The fourth communication part 50d is formed in the upper housing 3 along an up-and-down direction, and its one end portion communicates with the other end portion of the third communication part 50c and its other end communicates with the aforementioned annular groove 20c.

The bearing filter 55 is formed into a substantially cylindrical shape with metal material such as iron and aluminum alloy material, and has a passage hole 55a that penetrates an inside of the bearing filter 55. The bearing filter 55 further has, at its one end portion at the outlet port 42 side, the stepped cylindrical small diameter portion 55b that can contact the annular protruding portion 70a from an axial direction. A diameter of this small diameter portion 55b is smaller than that of the annular protruding portion 70a.

A filter portion 57 as a filtering portion is fixed to a top end opening, facing to the outlet port 42, of the passage hole 55a. This filter portion 57 is formed into a disk-shape with metal material or synthetic resin material, and its mesh size is around No. 80 (opening 0.198 mm) which is the same as the first embodiment.

Between an annular outer end surface of the other end portion of the bearing filter 55 and a plug 72 press-fixed in the annular recessed portion 70b, a coil spring 73 is provided. The bearing filter 55 is forced to the outlet port 42 side by a spring force of the coil spring 73. That is, the bearing filter 55 is forced by the spring force of the coil spring 73 so as to contact an opposing surface, facing to the pressure receiving surface 55c, of the annular protruding portion 70a. Here, a spring load of the coil spring 73 is arbitrarily set by a relationship with a discharge pressure acting on the outlet port 42.

Therefore, in a case where the discharge pressure of the oil discharged from the outlet port 42 by the pump operation of the oil pump 2 is a predetermined pressure or less, as shown in FIG. 13, the bearing filter 55 is located at a position at which a top end surface of the pressure receiving surface 55c contacts the opposing surface of the annular protruding portion 70a by the spring force of the coil spring 73.

When the discharge pressure of the oil becomes the predetermined pressure or greater by and according to increase in the number of revolutions of the pump, the pressure receiving surface 55c of the bearing filter 55 receives this discharge pressure through a gap between the annular protruding portion 70a and the small diameter portion 55b. The bearing filter 55 then moves backward against the spring force of the coil spring 73, and opens an inner side opening of the drain hole 71 by an outer peripheral surface of the bearing filter 55. With this, the oil discharged from the outlet port 42 to the relief passage 70 is exhausted to the oil pan 30. It is consequently possible to suppress an excessive increase in the pump discharge pressure then suppress breakage of the oil filter 49.

At this time, a press-fixed surface between the annular recessed portion 70b and the plug 72 is not completely sealed, and a back pressure when the bearing filter 55 moves backward is released from the press-fixed surface. Instead of this, a small vent (not shown) could be formed at the plug 72, then the back pressure could be released from this small vent.

As shown by a bold arrow in FIG. 12, the oil discharged from the outlet port 42 to the outlet passage 48 mostly flows into the discharge hole 48a from the outlet passage 48 and flows to the main oil gallery 10 side. On the other hand, as shown by a narrow arrow in FIG. 12, a part of the discharged oil passes through the filter portion 57 of the bearing filter 55 and flows into the communication passage 50 from the passage hole 55a. From here, in the same manner as the first embodiment, the oil flows into the annular groove 20c and flows to each of the plain bearings 11 to 14 through the passage grooves 17 and 18 etc., then lubrication of the inner and outer circumferential surfaces of the plain bearings 11 to 14 is made.

Accordingly, also in the present embodiment, each of the plain bearings 11 to 14 is sufficiently and actively supplied with the oil, and this can increase the durability of the plain bearings 11 to 14.

Further, since the oil discharged to the outlet passage 48 mostly flows along an outer surface of the filter portion 57, the contaminant trapped by the outer surface of the filter portion 57 is washed away and removed. Adhesion or accumulation of the contaminant to or on the outer surface of the filter portion 57 can thus be suppressed.

In addition, since the mesh size of the filter portion 57 is relatively large (relatively coarse) which is the same as the first embodiment, the flow resistance of oil can be suppressed.

Moreover, in the present embodiment, since the bearing filter 55 is used as a part of the relief valve 24, there is no need to provide another relief valve. It is therefore possible to reduce the manufacturing cost and an assembling cost.

Third Embodiment

Figure 16:
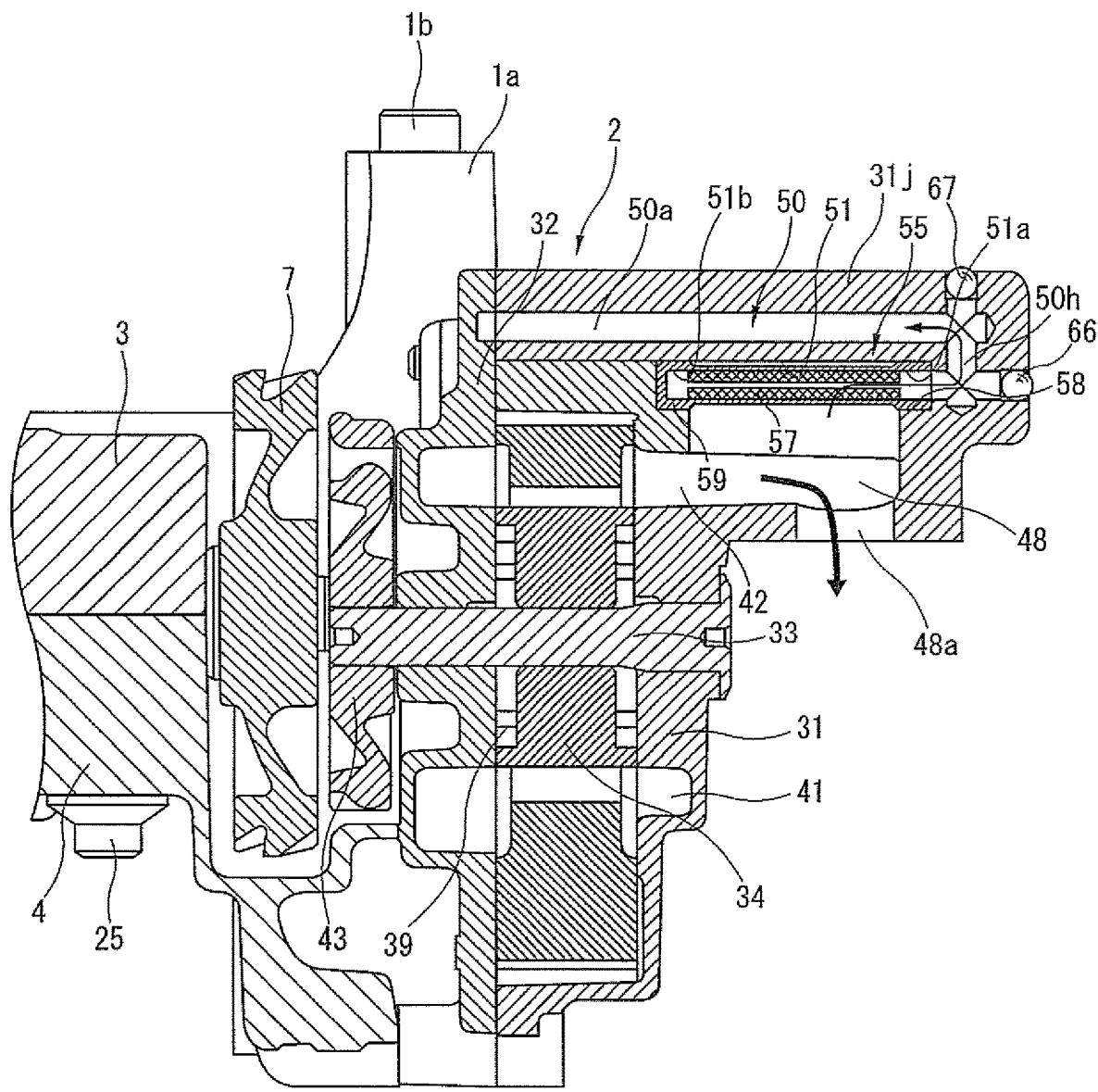
FIG. 16 is a side view of the oil pump and the balancer device according to a third embodiment with parts of the oil pump and the balancer device being cut.

FIG. 16 shows a third embodiment in which the communication passage 50 branching off from the outlet passage 48 is formed in a protruding wall 31j that is formed integrally with an upper end portion of the housing body 31, and the bearing filter 55 is placed at a part of the outlet passage 48.

That is, an installation hole 51 is formed on an inner wall surface of the protruding wall 31j of the housing body 31. In the protruding wall 31j, the communication passage 50 is bent so as to be folded from an end portion of the installation hole 51.

The installation hole 51 is formed straight along a part of the outlet passage 48, and is placed so as to be substantially orthogonal to the discharge hole 48a. On the other hand, the communication passage 50 has a straight first communication part 50a that is bent so as to be folded from the end portion on an axial of the installation hole 51 through a bending portion 50h. This first communication part 50a is formed substantially parallel to the installation hole 51. Here, although a part of the installation hole 51 is arranged along and parallel to the outlet passage 48, the arrangement of the installation hole 51 is not only the parallel to the outlet passage 48, but the installation hole 51 could be arranged at a slight angle with respect to the parallel to the outlet passage 48.

A downstream side of the communication passage 50 communicates with the annular groove 20c through a second communication part, a third communication part and a fourth communication part (all not shown) as parts of the communication passage 50 which are formed in the cover member 32 etc. through the first communication part 50a.

The outlet passage 48 communicates with the main oil gallery (not shown), and the main oil gallery is provided with the oil filter.

The bearing filter 55 is the same as that of the first embodiment. The first and second cylindrical portions 58 and 59 at both end portions of the bearing filter 55 are accommodated and fixed in the first and second installation holes 51a and 51b of the installation hole 51 respectively. Further, the filter portion 57 as a filtering portion is fixed in the supporting frame 56.

The bearing filter 55 is provided at an opposite position to the discharge hole 48a of the outlet passage 48 through the installation hole 51. That is, the bearing filter 55 is placed at a position that is an opposite side to the discharge hole 48a of the outlet passage 48 communicating with the outlet port 42. That is, the bearing filter 55 is provided at a position along a flow direction of the oil discharged from the outlet port 42 to the outlet passage 48. Here, reference signs 66 and 67 in the drawing are ball plug bodies.

As shown by a bold arrow in the drawing, the oil discharged from the outlet port 42 mostly passes through the outlet passage 48 (the discharge hole 48a) and flows to the main oil gallery 10 side. On the other hand, as shown by a narrow arrow in the drawing, a part of the oil passes through the filter portion 57, flows to the bending portion 50h from the opening 58a of the first cylindrical portion 58, and flows into the first communication part 50a. This oil is further supplied to each of the plain bearings 11 to 14 through the annular groove 20c of the balancer device 1.

In this manner, since a part of the oil flowing out of the outlet port 42 is sufficiently supplied to each of the plain bearings 11 to 14 through the bearing filter 55, durability of each of the plain bearings 11 to 14 can be increased.

Further, the bearing filter 55 is arranged at a specific position that is the opposite side to the discharge hole 48a of the outlet passage 48 and offset from the discharge hole 48a. With this arrangement, a part of the oil discharged from the outlet port 42 flows along the outer peripheral surface of the bearing filter 55 in the axial direction toward the discharge hole 48a side. That is, the oil flows so as to wash the outer peripheral surface of the filter portion 57. Therefore, the contaminant trapped on the outer peripheral surface of the filter portion 57 is effectively removed. Adhesion or accumulation of the contaminant to or on the outer peripheral surface of the filter portion 57 can thus be suppressed.

The present invention is not limited to the configurations of the above embodiments, but can be applied to not only the variable displacement oil pumps but also normal fixed-displacement oil pumps. As the oil pump, not only the vane pumps but also inscribed trochoid gear pumps and external gear pumps can be used.

Further, regarding an oil pump receiving side to which the oil pump 2 is fixed, it is not limited to the balancer device 1, but it could be the internal combustion engine. That is, the oil pump 2 could not be provided fixedly to the balancer device 1, but could be provided separately from the balancer device 1.

In addition, as the bearing portion of the drive shaft 5 and the driven shaft 6, it is not limited to the plain bearing. For instance, it could be a needle bearing or a ball bearing.

Furthermore, the throttle portion 54 of the first embodiment can be applied to the second and third embodiment.

In the above embodiments, two balancer shafts are used. However, the present invention can also be applied to a balancer device having one balancer shaft. Further, in the above embodiments, the housing is divided into the upper and lower housings in a vertical direction. However, the housing could be divided into two in a front-and-rear direction. Moreover, the balancer shaft might be directly placed and accommodated in the cylinder block.

As the balancer device, the oil pump and the lubricating system for the balancer shaft bearing portion based on the embodiments explained above, for instance, the followings are raised.

As one aspect of the present invention, a balancer device for an internal combustion engine comprises: a housing having therein an accommodation section and a bearing portion; a balancer shaft rotatably provided at the bearing portion; an oil pump provided in the housing and driven by power from the balancer shaft, wherein an outlet portion of the oil pump communicates with a main oil gallery of the internal combustion engine through an oil filter that is provided outside the housing; a bearing filter provided in an outlet passage that extends from the outlet portion toward the outside of the housing and filtering a part of oil that flows in the outlet passage; and a communication passage branching off from the outlet passage and supplying the oil filtered by the bearing filter to the bearing portion.

According to the present invention, it is possible to increase the durability of the bearing portion.

As a preferable balancer device, a mesh size of the bearing filter is greater than that of the oil filter. According to the present invention, since the mesh size of the bearing filter is greater than that of the oil filter, an oil supply performance into the communication passage is increased, and also this reduces a tendency for the bearing filter to be clogged, as compared with the oil filter.

As a far preferable balancer device, a part of a filtering portion of the bearing filter is arranged in a direction that crosses a flow direction of the oil flowing in the outlet passage.

According to the present invention, contaminant such as metal wear particles trapped in the oil flowing in the outlet passage can be guided to the main oil gallery side provided outside the housing without flowing in the communication passage. It is therefore possible to prevent the bearing filter from being clogged.

As a far preferable balancer device, the filtering portion of the bearing filter is formed into a cylindrical shape.

According to the present invention, since the filtering portion is formed into the cylindrical shape, a large surface area can be secured with a small space. Therefore, regardless of how the bearing filter is placed in the communication passage, a section that crosses the oil flow direction in the outlet passage can be small. This reduces a tendency for the filtering portion to be clogged.

As a far preferable balancer device, the filtering portion is arranged in a direction that is orthogonal to the flow direction of the oil flowing in the outlet passage or a direction along the oil flow direction.

According to the present invention, since a flow of the oil flowing in the outlet passage can be changed by the filtering portion, an oil flow amount into the communication passage can be restrained.

As a far preferable balancer device, the bearing filter has a supporting frame having tubular both end portions in an axial direction of the bearing filter, one of which has an opening and the other of which has a closed-bottom, and the filtering portion supported in the supporting frame.

As a far preferable balancer device, the supporting frame has long narrow frame portions that connect the both end portions of the bearing filter, and the filtering portion is supported in the frame portions.

According to the present invention, an exposure area of the filtering portion set inside the frame portions is as large as possible by the frame portions of the supporting frame. An oil filtering effect can thus be increased.

As a far preferable balancer device, the outlet passage is provided, at a branch portion with the communication passage, with an installation hole in which the bearing filter is installed. Further, between one end side of the installation hole and the other end portion of the supporting frame, a forcing member that presses the one end portion of the supporting frame toward the other end side of the installation hole is provided.

By pressing the one end portion of the supporting frame toward the other end side of the installation hole by the forcing member, a sealing performance of the opening of the one end portion of the supporting frame can be secured, then oil leak from an outside of the one end portion of the supporting frame to the communication passage can be suppressed.

As a far preferable balancer device, a tubular space portion is formed between a portion except the both end portions of the supporting frame and an inner circumferential surface of the installation hole.

Forming of the tubular space portion can facilitate reception of a dynamic pressure of the oil flowing in the outlet passage by the whole of the filtering portion. This can further reduce the tendency for the filtering portion to be clogged.

As a far preferable balancer device, an outside diameter of the one end portion of the supporting frame is smaller than that of the other end portion of the supporting frame.

As a far preferable balancer device, the bearing portion is an annular plain bearing formed by coupling half-cut arc bearing metals.

It is essential for the plain bearing to be supplied with the lubricating oil, and durability of the plain bearing considerably decreases due to inflow of the metal wear particles Therefore, use of the present invention brings about a beneficial effect.

As a far preferable balancer device, an oil vent is formed at the plain bearing, and the communication passage and an inner circumferential side of the plain bearing communicate with each other through the oil vent.

According to the present invention, a lubricating performance of the plain bearing is increased.

As a far preferable balancer device, an inner circumferential portion of the plain bearing is made of a softer material than that of an outer circumferential portion of the plain bearing.

According to the present invention, contaminant trapped at the inner circumferential surface side of the plain bearing can be embedded or captured on the inner circumferential surface of the plain bearing.

As a far preferable balancer device, the inner circumferential portion of the plain bearing is made of an aluminium alloy material.

As a far preferable balancer device, a throttle portion is provided in the communication passage. An amount of the oil flowing to the bearing portion can be arbitrarily set by the throttle portion.

As a far preferable balancer device, the housing is formed by joining a plurality of blocks together. Further, the throttle portion is set so as to connect opposing surfaces of the joined blocks of the housing, and the throttle portion is detachable.

According to the present invention, the throttle portion can be replaced if necessary, or could be replaced with a manner that narrows a passage cross section of the communication part of the communication passage if necessary. Further, oil leak from a boundary between the opposing surfaces of the joined blocks can be suppressed.

As a far preferable balancer device, the throttle portion is formed into a hollow pipe, and one end opening and the other end opening of the throttle portion are inserted and fixed in insertion holes respectively which are formed on the opposing surfaces of the joined blocks of the housing so as to face to each other.

As a far preferable balancer device, the throttle portion also has a function of making positioning between components (the blocks) where the insertion holes are formed.

As another aspect of the present invention, a balancer device for an internal combustion engine comprises: a housing having therein an accommodation section and a bearing portion; a balancer shaft rotatably provided at the bearing portion; a communication passage provided so as to branch off from an oil supply portion that supplies oil to a sliding part of the internal combustion engine for lubrication by an oil pump, the communication passage communicating with the bearing portion; a bearing filter provided at the oil supply portion and filtering oil that flows from the oil supply portion into the communication passage; and an oil-pouring portion pouring oil, which flows from the oil supply portion and is not filtered by the bearing filter, toward the sliding part of the internal combustion engine.

As a further aspect of the present invention, an oil pump supplying oil to a sliding part of an internal combustion engine comprises: a bearing filter filtering a part of discharged oil and not filtering the other discharged oil; a first passage supplying the oil having been filtered by the bearing filter to a bearing portion of a balancer device; and a second passage pouring the oil not having been filtered by the bearing filter toward the sliding part of the internal combustion engine.

As a further aspect of the present invention, a lubricating system for a balancer shaft bearing portion comprises: a balancer shaft rotatably provided at a bearing portion; an oil pump whose outlet portion communicates with a main oil gallery of an internal combustion engine through an oil filter; a bearing filter provided in a passage that extends from the outlet portion toward the main oil gallery, the bearing filter filtering a part of oil and not filtering the other oil; and a communication passage supplying the oil having been filtered by the bearing filter to the bearing portion.

The invention claimed is:

1. A balancer device for an internal combustion engine comprising:
   a housing having therein an accommodation section and a bearing portion;
   a balancer shaft rotatably provided at the bearing portion;
   an oil pump provided in the housing and driven by power from the balancer shaft, wherein an outlet portion of the oil pump communicates with a main oil gallery of the internal combustion engine through an oil filter that is provided outside the housing;
   a bearing filter provided in an outlet passage that extends from the outlet portion toward the outside of the housing and filtering a part of oil that flows in the outlet passage; and
   a communication passage branching off from the outlet passage and supplying the oil filtered by the bearing filter to the bearing portion.

2. The balancer device for the internal combustion engine as claimed in claim 1, wherein:
   a mesh size of the bearing filter is greater than that of the oil filter.

3. The balancer device for the internal combustion engine as claimed in claim 1, wherein:
   a part of a filtering portion of the bearing filter is arranged in a direction that crosses a flow direction of the oil flowing in the outlet passage.

4. The balancer device for the internal combustion engine as claimed in claim 3, wherein:
   the filtering portion of the bearing filter is formed into a cylindrical shape.

5. The balancer device for the internal combustion engine as claimed in claim 4, wherein:

the filtering portion is arranged in a direction that is orthogonal to the flow direction of the oil flowing in the outlet passage or a direction along the oil flow direction.

6. The balancer device for the internal combustion engine as claimed in claim 4, wherein:
the bearing filter has a supporting frame having tubular both end portions in an axial direction of the bearing filter, one of which has an opening and the other of which has a closed-bottom, and the filtering portion supported in the supporting frame.

7. The balancer device for the internal combustion engine as claimed in claim 6, wherein:
the supporting frame has long narrow frame portions that connect the both end portions of the bearing filter, and the filtering portion is supported in the frame portions.

8. The balancer device for the internal combustion engine as claimed in claim 7, wherein:
the outlet passage is provided, at a branch portion with the communication passage, with an installation hole in which the bearing filter is installed, and
between one end side of the installation hole and the other end portion of the supporting frame, a forcing member that presses the one end portion of the supporting frame toward the other end side of the installation hole is provided.

9. The balancer device for the internal combustion engine as claimed in claim 6, wherein: a tubular space portion is formed between a portion except the both end portions of the supporting frame and an inner circumferential surface of an installation hole.

10. The balancer device for the internal combustion engine as claimed in claim 9, wherein:
an outside diameter of the one end portion of the supporting frame is smaller than that of the other end portion of the supporting frame.

11. The balancer device for the internal combustion engine as claimed in claim 1, wherein:
the bearing portion is a plain bearing.

12. The balancer device for the internal combustion engine as claimed in claim 11, wherein:
an oil vent is formed at the plain bearing, and the communication passage and an inner circumferential side of the plain bearing communicate with each other through the oil vent.

13. The balancer device for the internal combustion engine as claimed in claim 11, wherein:
an inner circumferential portion of the plain bearing is made of a softer material than that of an outer circumferential portion of the plain bearing.

14. The balancer device for the internal combustion engine as claimed in claim 13, wherein:
the inner circumferential portion of the plain bearing is made of an aluminium alloy material.

15. The balancer device for the internal combustion engine as claimed in claim 1, wherein:
a throttle portion is provided in the communication passage.

16. The balancer device for the internal combustion engine as claimed in claim 15 wherein:
the housing is formed by joining a plurality of blocks together, and
the throttle portion is set so as to connect opposing surfaces of the joined blocks of the housing, and the throttle portion is detachable.

17. The balancer device for the internal combustion engine as claimed in claim 16 wherein:
the throttle portion is formed into a hollow pipe, and
one end opening and the other end opening of the throttle portion are inserted and fixed in insertion holes respectively which are formed on the opposing surfaces of the joined blocks of the housing so as to face to each other.

18. A balancer device for an internal combustion engine comprising: a housing having therein an accommodation section and a bearing portion; a balancer shaft rotatably provided at the bearing portion; a communication passage provided so as to branch off from an oil supply portion that supplies oil to a sliding part of the internal combustion engine for lubrication by an oil pump, the communication passage communicating with the bearing portion; an oil filter; a bearing filter provided at in the oil supply portion, the bearing filter filtering oil that flows from the oil supply portion into the communication passage; and an oil-pouring portion pouring oil, which flows from the oil supply portion and is not filtered by the bearing filter, toward the sliding part of the internal combustion engine through the oil filter.

19. An oil pump supplying oil to a sliding part of an internal combustion engine comprising: an oil filter; a bearing filter filtering a part of discharged oil and not filtering the other discharged oil; a first passage supplying the oil having been filtered by the bearing filter, which is disposed in the first passage, to a bearing portion of a balancer device; and a second passage pouring the oil not having been filtered by the bearing filter toward the sliding part of the internal combustion engine through the oil filter.

20. A lubricating system for a balancer shaft bearing portion comprising:
a balancer shaft rotatably provided at a bearing portion;
an oil pump whose outlet portion communicates with a main oil gallery of an internal combustion engine through an oil filter;
a bearing filter provided in a passage that extends from the outlet portion toward the main oil gallery, the bearing filter filtering a part of oil and not filtering the other oil; and
a communication passage supplying the oil having been filtered by the bearing filter to the bearing portion.

* * * * *